United States Patent
Marsh et al.

(10) Patent No.: US 11,644,220 B1
(45) Date of Patent: May 9, 2023

(54) MULTIPLE WELL PAIRS FOR SCALING THE OUTPUT OF GEOTHERMAL ENERGY POWER PLANTS

(71) Applicant: Geothermal Technologies, Inc., Bel Air, MD (US)

(72) Inventors: Bruce D. Marsh, Hunt Valley, MD (US); Saman Karimi, Baltimore, MD (US); James Hollis, Incline Village, NV (US); J. Gary McDaniel, Bel Air, MD (US)

(73) Assignee: Geothermal Technologies, Inc., Bel Air, MD (US)

( * ) Notice: Subject to any disclaimer, the term of this patent is extended or adjusted under 35 U.S.C. 154(b) by 0 days.

(21) Appl. No.: 17/554,126

(22) Filed: Dec. 17, 2021

(51) Int. Cl.
  *F24T 10/10* (2018.01)
  *F03G 4/00* (2006.01)

(52) U.S. Cl.
  CPC .............. *F24T 10/10* (2018.05); *F03G 4/029* (2021.08); *F03G 4/072* (2021.08)

(58) Field of Classification Search
  CPC ........... F24T 10/10; F03G 4/029; F03G 4/072
  USPC ............................................. 60/641.2–641.4
  See application file for complete search history.

(56) References Cited

U.S. PATENT DOCUMENTS

| 4,319,635 A * | 3/1982 | Jones | E21B 43/40 |
| | | | 166/227 |
| 2006/0137349 A1* | 6/2006 | Pflanz | F28D 20/0052 |
| | | | 60/641.2 |
| 2011/0041500 A1* | 2/2011 | Riley | F24T 10/30 |
| | | | 60/641.3 |
| 2012/0001429 A1* | 1/2012 | Saar | F24T 10/40 |
| | | | 290/52 |

(Continued)

FOREIGN PATENT DOCUMENTS

| CN | 105840146 A | 8/2016 |
| CN | 107461603 B | 10/2019 |

(Continued)

OTHER PUBLICATIONS

International Search Report and Written Opinion of the International Searching Authority directed to related International Patent Application No. PCT/US2022/075439, dated Sep. 23, 2022; 13 pages.

(Continued)

*Primary Examiner* — Hoang M Nguyen
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for using a hot sedimentary aquifer (HSA) in geothermal energy generation applications. An example embodiment operates by pumping, via multiple extraction wells, heated (Continued)

water from one or more extraction depths of an HSA. The HSA is identified based on a permeability satisfying a threshold permeability range. The example embodiment further operates by extracting, via a power generation unit, heat from the heated water to generate power and transform the heated water into cooled water. Subsequently, the example embodiment operates by injecting, via multiple injection wells, the cooled water at one or more injection depths of the HSA.

27 Claims, 14 Drawing Sheets

(56) References Cited

U.S. PATENT DOCUMENTS

| | | |
|---|---|---|
| 2012/0018120 A1 | 1/2012 | Danko |
| 2015/0300327 A1 | 10/2015 | Sweatman et al. |
| 2015/0354859 A1* | 12/2015 | Marsh ................ F24T 10/20 165/45 |
| 2017/0211849 A1* | 7/2017 | Muir ................... F03G 7/04 |
| 2020/0191444 A1* | 6/2020 | Nevison ............... F24T 50/00 |

FOREIGN PATENT DOCUMENTS

| | | |
|---|---|---|
| SU | 1633237 A1 | 3/1991 |
| WO | WO 2013/067570 A1 | 5/2013 |
| WO | WO 2014/148924 A1 | 9/2014 |
| WO | WO 2018/206773 A1 | 11/2018 |
| WO | WO 2021/167701 A1 | 8/2021 |

OTHER PUBLICATIONS

C.J.L. Willems, H.M. Nick, T. Goense, D.F. Bruhn, "The impact of reduction of doublet well spacing on the Net Present Value and the life time of fluvial Hot Sedimentary Aquifer doublets," Geothermics, vol. 68, 2017, pp. 54-66, ISSN 0375-6505, https://doi.org/10.1016/j.geothermics.2017.02.008. (Year: 2017).

* cited by examiner

1100

1102

DETERMINING, ACCORDING TO A GEOTHERMAL CHARACTERISTIC OF A HOT SEDIMENTARY AQUIFER (HSA) BELOW A SURFACE LOCATION THAT SATISFIES A THRESHOLD ASSOCIATED WITH PROVIDING GEOTHERMAL ENERGY, EXTRACTION DEPTHS FOR EXTRACTION WELLS DISPOSED TO EXTRACT HEATED WATER FROM THE HSA AND INJECTION DEPTHS FOR INJECTION WELLS DISPOSED TO INJECT COOLED WATER INTO THE HSA THAT IS GENERATED FROM A HEAT EXTRACTION PROCESS ASSOCIATED WITH CAPTURING GEOTHERMAL ENERGY

1104

CONFIGURING A GEOTHERMAL SYSTEM IN ASSOCIATION WITH THE SURFACE LOCATION TO EXTRACT THE HEATED WATER FROM THE HSA AT THE EXTRACTION DEPTHS

1106

CONFIGURING THE GEOTHERMAL SYSTEM TO INJECT COOLED WATER INTO THE HSA AT THE INJECTION DEPTHS

FIG. 11

MULTIPLE WELL PAIRS FOR SCALING THE OUTPUT OF GEOTHERMAL ENERGY POWER PLANTS

BACKGROUND

Geothermal heat is an excellent source of renewable energy as the Earth's temperature naturally increases with depth. Although there are many geothermal energy facilities around the world, these facilities are typically located in places with volcanic activity, which provide a high temperature and are an easily accessible resource for energy harvesting. Unfortunately, these volcanic regions are geographically limited. Hot dry rock is another potential source of geothermal energy, but nearly all projects attempting to harvest heat in this manner have failed. Hot sedimentary aquifers are widespread and represent a new, promising, and very economical source for geothermal energy production.

BRIEF DESCRIPTION OF THE FIGURES

The accompanying drawings are incorporated herein and form a part of the specification.

FIG. 11 is a flowchart illustrating a process for configuring a geothermal system, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
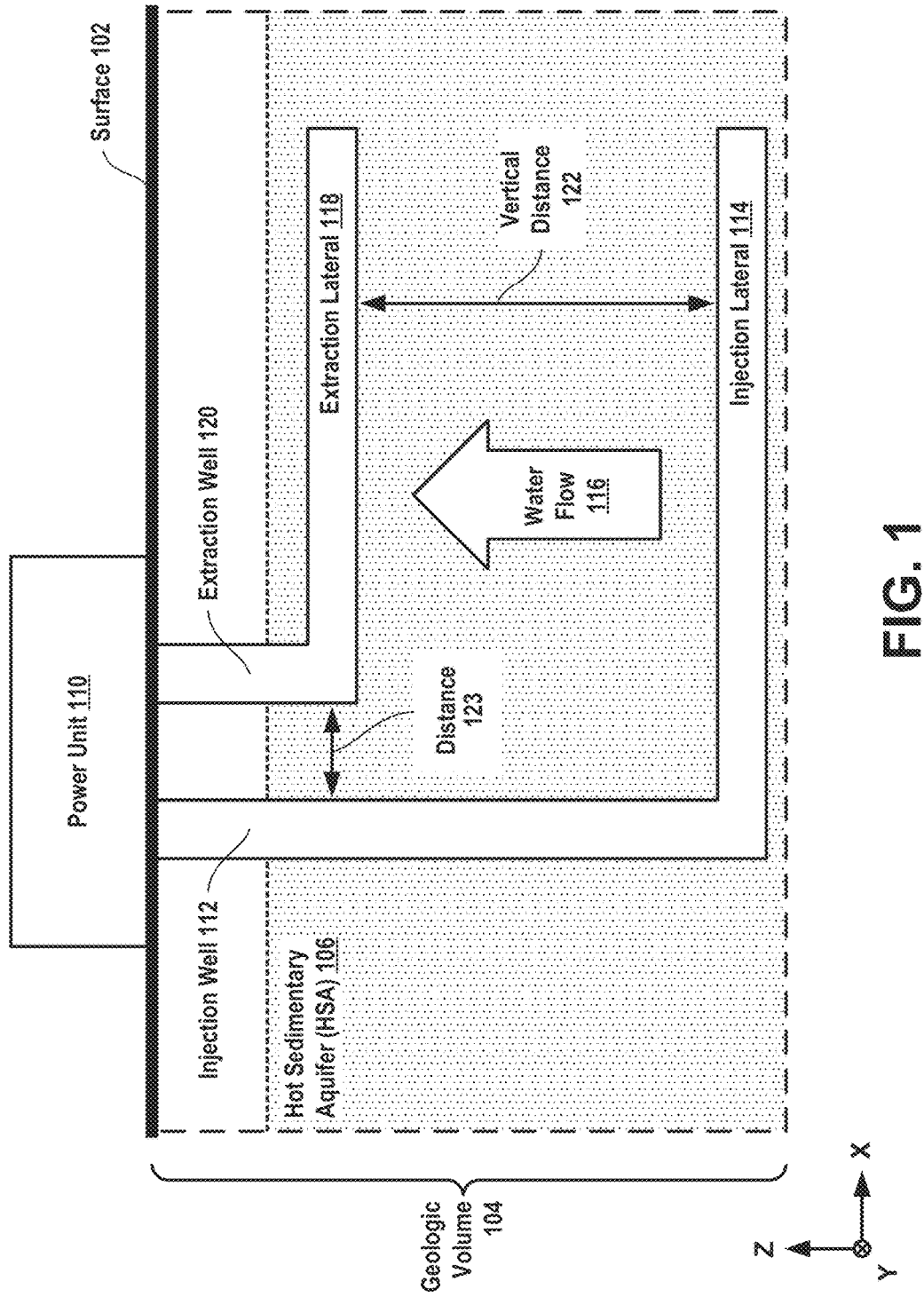
FIG. 1 is a schematic diagram of an example natural geothermal system, according to some embodiments.

Fossil fuels (or hydrocarbons) are the primary source of energy for the world today, and they present two major problems. First, fossil fuel resources are not renewable, meaning that there is a finite amount of them on our planet. Second, using fossil fuels produces carbon dioxide ($CO_2$), the major greenhouse gas and the main driver of the Earth's atmospheric warming. With the ever-increasing population on Earth, the need for newer, renewable and clean sources of energy is more evident than ever before. In contrast to fossil fuels, geothermal energy has the potential to provide a functionally infinite amount of clean energy, with no carbon footprint. And in contrast to other renewable energies, geothermal energy is constantly available and is the best candidate for providing baseload power. The earlier inefficient designs of geothermal plants, for a number of reasons, were not able to provide a worldwide commercial level of energy extraction from this infinite source of energy beneath our feet. The current locations of geothermal plants are geographically biased, and only extract energy almost exclusively in the proximity of volcanic regions from naturally-occurring, geyser-like hydrothermal systems. Thus, while geothermal energy has a massive potential, the share of such energy in the global energy market is minute.

In one example, geothermal energy can have two main applications: direct use (e.g., heat generation): and power generation. However, as described above, geothermal energy extraction is primarily restricted to seismically and volcanically active regions such as in the western United States. Extracting energy from other parts of Earth's continental crust (e.g., seismically non-active regions) can be expensive, non-economic, and short-lived. Some geothermal systems, referred to as enhanced geothermal systems (EGS), generate man-made hydrothermal reservoirs through artificial fracking methods. These geothermal systems can be constructed in hot dry rock (HDR) that are commonly found at sufficiently great depths below the surface such that high enough temperatures are encountered. Constructing an EGS in HDR involves drilling into the HDR and creating an artificially made reservoir through fracturing. Fracturing, however, is a complex and expensive engineering task that requires a substantial amount of equipment (e.g., hardware resources, environmental resources, computing resources, etc.) and is ecologically and environmentally damaging.

Artificially-constructed fractured reservoirs can be designed to contain an extensive plexus of fractures through which fluid flow is facilitated horizontally and/or randomly and without obstruction. Under such geothermal systems, water from an injection well is made to flow to and through the artificially fractured reservoir, where it becomes heated and then is pumped back up to the surface to the energy conversion unit via the extraction well. As such, the thermal energy of the water is transferred from the hot solid rock through thermal conduction. The efficiency of these conventional geothermal systems is limited because the thermal diffusivity of rock is low. As the waters in the subsurface heat up, the associated rock must proportionally cool down, and the time for replacing the lost rock-heat is very long. The longevity of such systems is thus relatively short, less than 10 years after which the water temperature rapidly drops below the economic level.

However, the amount of power that can be generated from a single well pair, whether in HDR or in a hot sedimentary aquifer (HSA), can be limited. For example, the wellbore diameters and downhole pump designs limit the flow rates that can be achieved. In addition, HDRs and HSAs typically range in temperature from 80 degrees Celsius (° C.) to about 300° C. depending on location and depth. As a result, upper limitations on flow rates and temperatures place a ceiling on the amount of geothermal energy that can be harvested, regardless of the system used.

In one illustrative example, modern data centers typically require about 100 megawatts to power their buildings and computing infrastructure. However, conventional geothermal power plants may only be able to produce about 20 megawatts of power. Thus, there is a need for a geothermal system having a compact footprint that can generate 100 megawatts or more to power such data centers.

Therefore, to scale a geothermal power plant to meet the power generation requirements of modern data centers, oil and gas fields, local microgrids, and other infrastructure, or simply to provide power to a utility grid, the above-ground power plant can be fed with hot water from multiple wells and/or well pairs substantially simultaneously. However, designing such a system can be complex. Parameters such as well depth, lateral length (e.g., if laterals are used), well spacing, well orientation, downhole temperature, water salinity, aquifer stratigraphy (e.g., if in an aquifer), rock composition, permeability, porosity, fracture systems, etc. all play a role in the design and configuration of each well and/or well pair. These factors can play an even more significant role in the placing of multiple wells and/or well pairs so that any negative interactions between them are reduced or substantially eliminated and any positive interactions, when possible, are enhanced.

Provided herein are system, apparatus, device, method and/or computer program product embodiments, and/or combinations and sub-combinations thereof, illustrate several system designs that demonstrate the ability to scale a geothermal power plant using multiple wells and/or well pairs. For instance, the embodiments disclosed herein can provide for harvesting geothermal energy on a widespread, global basis using multiple underground lateral well pairs (e.g., multiple pairs of extraction and injection wells) having lateral components disposed in an HSA and angled vertical components connecting the lateral components to a single power plant.

In some embodiments, the geothermal systems disclosed herein can provide for, but are not limited to: (i) inducing a large scale subsurface convection flow field by imposing dipole pressure gradients through pumping between multiple extraction and injection wells; (ii) pumping hot water from this subsurface system via multiple extraction wells; (iii) extracting heat or thermal energy from the extracted superheated water via a power generation unit; (iv) using the extracted heat to generate a power output of 25 megawatts, 50 megawatts, 100 megawatts, 250 megawatts, 500 megawatts, or any other suitable power output; and (v) returning, via pumping, the resultant cooled water to the subsurface through multiple injection wells, where the water can be reheated, continuing the cycle. The overall induced convective system allows the harvesting of hot waters over a vastly larger area than that simply represented by the distance between the extraction and reinjection wells and over a vastly longer time. Moreover, the lengths and positioning of the coupled lateral extraction and reinjection wells can be styled or crafted to fit any suitable sedimentary formation.

In some embodiments, the present disclosure provides geothermal systems capable of steadily harvesting economic energy from a wide spectrum of sedimentary aquifers, thick and thin sedimentary aquifers, to generate a power output between about, for example, 25 megawatts and 500 megawatts. These geothermal systems can provide these power output capabilities for many decades. The geothermal systems disclosed herein can be configured to perform operations including, but not limited to, identifying an adequately deep HSA such that the waters of the porous aquifer are of a sufficiently high-temperature for power generation. If the sedimentary aquifer is sufficiently thick, the locations of the injection wells can be placed at the bottom of the layer and the locations of the extraction wells can be placed vertically above the injection wells, near the top of the layer. In thin sedimentary layers, which present more challenging situations, the injection and extraction wells may be very nearly at the same depth.

In some embodiments, the present disclosure provides a method of harvesting geothermal energy that includes, but is not limited to, pumping water to and from the sedimentary aquifer via the injection wells and the extraction wells, respectively. This pumping process can be designed to create a pressure field that induces or stimulates a flow field or convection cell within the sedimentary aquifer that generates a relatively large-scale zone of mixing between the subsurface waters with the re-injected pumped waters. Subsequently, the extraction wells pump the now heated water to the surface and into the conversion unit or power station.

In some embodiments, the geothermal systems disclosed herein can include a power generation unit, a pump system, a well system disposed within an HSA or a series of HSAs (e.g., one HSA in the Lyons formation and another HSA in the Fountain formation shown in FIG. 10; one HSA in the Lyons formation and another HSA in the Amazon formation below the Lyons formation; etc.), and a regulatory device. The well system can include multiple extraction wells that enable the pump system to provide heated water at one or more extraction depths of the HSA to the power generation unit. The well system can further include multiple injection wells that enable the pump system to inject cooled water from the power generation unit into the HSA at one or more injection depths. In one example, the well system can have a first well pair disposed in a first HSA and a second well pair disposed in a second HSA different from the first HSA. The first HSA can be, for example, a thick-bed HSA (e.g., having a thickness between about 100 meters and 500 meters), and the second HSA can be, for example, a thin-bed HSA (e.g., having a thickness less than about 100 meters).

The present disclosure provides for many configurations that can be engineered to stimulate convective heat flow in a series of underground systems feeding a single above-ground power plant. For example, the extraction wells and the injection wells can be formed according to a wagon-wheel pattern, a wine-rack pattern, a gun-barrel pattern, a chicken-foot pattern, or a vertically-stacked pattern. The regulatory device can be configured to generate first control signals configured to instruct the pump system to pump the heated water from the extraction wells to the power generation unit. The regulatory device can be further configured to generate a second control signal configured to instruct the power generation unit to extract thermal energy from the heated water and to transform the heated water into cooled water. The regulatory device can be further configured to generate third control signals configured to instruct the pump system to pump the cooled water from the power generation unit to the injection wells. The pumping system can be installed on the surface or underground. The pumping system can cause the extraction wells to extract hot water from the subsurface and cause the injection wells to re-inject cooled water back into the subsurface. As a result, the power generation unit can generate a power output between about 25 megawatts and 500 megawatts.

In some embodiments, the present disclosure provides geothermal systems configured to produce about 25 to 500 megawatts or more using an HSA having a thickness less than about 500 meters (e.g., 100 to 500 meters; or less than 100 meters, such as 30 to 40 meters). In the geothermal systems disclosed herein, lateral drilled injection and extraction wells may be vertically disjointed and offset horizontally. More specifically, water (e.g., liquid water, vaporized water, or any other type of water-based fluid) is extracted from the HSA via multiple extraction wells. The water is processed to capture heat from the heated water, resulting in cooled water. The cooled water is then re-injected via multiple injection wells. The imposed pumping pressure field induces a large-scale fluid convection or circulation system in the HSA which continually recharges the geothermal system. As the area between each pair of injection and extraction wells becomes larger, an increasingly larger amount of heat is available for harvesting. Thus, the lateral components of the injection and extraction wells of each well pair can be offset (e.g., by 300 meters, 500 meters, etc.), which allows for harvesting heat from a large area. An increase in well spacing may also necessitate a need for larger pumping pressures in the extraction well and/or the injection well of each well pair. Correspondingly, in contrast with previous EGS systems, the geothermal systems disclosed herein are relatively simplified and inexpensive because they do not involve any artificial fracturing of rock at depth to create a manmade reservoir.

In some embodiments, an HSA is a targeted geothermal reservoir that is sufficiently hot and of almost arbitrary and variable thickness. In order to identify HSAs that have the necessary threshold characteristics to provide an economically desirable amount of heat, specific geologic terrains must be sought through a process of characterization and analysis. Through careful analyses of the desirable geophysical characteristics, the potential efficiency of the formation can be determined. Using the methods and systems described herein, depending on the geothermal characteristics of the HSA, geothermal energy can be extracted for relatively long periods of time (e.g., 10-20 years, or even over 50 years). Additionally, the geothermal systems disclosed herein can be constructed at a vast array of geographically diverse locations on Earth beyond the volcanic regions typically associated with geothermal systems.

In some embodiments, HSAs located in shallow crust, or in regions with insufficient or low background heat fluxes, are generally not able to produce an adequate amount of geothermal energy for generating power. These HSAs, however, may be suitable for producing water hot enough for direct use in the heating of homes and buildings. Although thicker HSAs may be more suitable for power generation, even thin sedimentary aquifers are capable of producing energy using the geothermal systems disclosed herein, which are suitably well-designed and can be crafted to fit the specific aquifer. For example, while a geothermal system may generate a power output of about 20 megawatts from a thin HSA using only a single pair of extraction and injection wells, the geothermal systems disclosed herein may generate a power output of about 25 to 500 megawatts or more from thin HSAs, thick HSAs, or a combination of thick HSAs and thin HSAs using multiple pairs of extraction and wells as described herein. In some embodiments, the multiple pairs of extraction injection wells may be formed according to a wagon-wheel pattern (e.g., as described with reference to FIG. 6), a wine-rack pattern (e.g., as described with reference to FIG. 7), a gun-barrel pattern (e.g., as described with reference to FIGS. 8A and 8B), a chicken-foot pattern (e.g., as described with reference to FIG. 9), a vertically-stacked pattern (e.g., as described with reference to FIG. 10), any other suitable pattern or arrangement, or any combination thereof.

Figure 4:
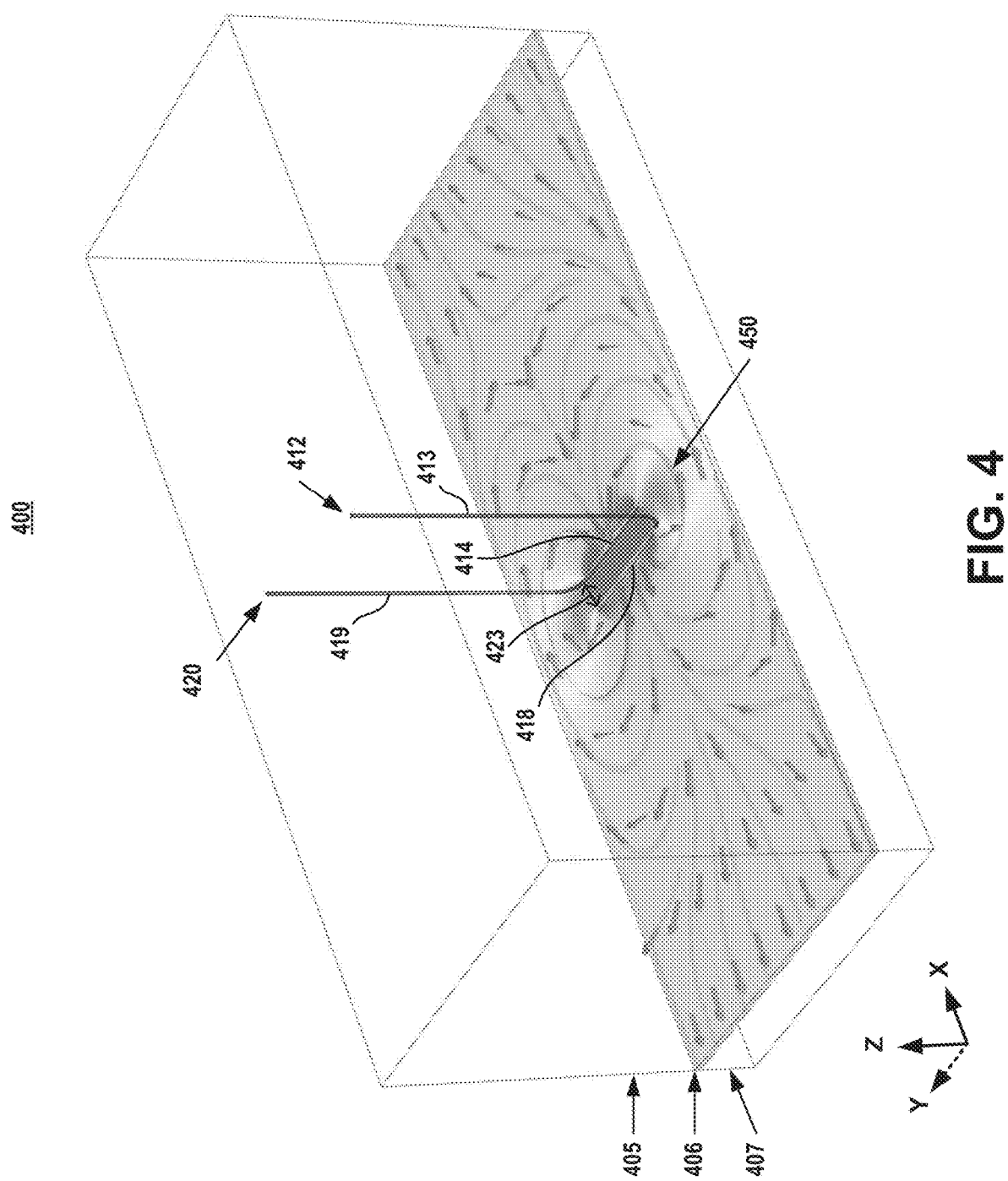
FIG. 4 shows the results of an example numerical simulation of an example NAT-EGS, according to some embodiments.

In some embodiments, the geothermal systems disclosed herein provide for inducing a large-scale convective or flow field within the sedimentary aquifer due to gravity and/or head pressure (e.g., in the case of thicker aquifers where the extraction and injection wells are vertically separated), pressure differentials in the aquifer itself, a dipolar pumping pressure field imposed between each pair of injection and extraction wells, or a combination thereof. Prior to the initiation of pumping, the fluid within the aquifer can have a slow regional flow without substantially any local convective pattern or recirculation system. Upon initiation of pumping, the pattern of fluid flow is soon highly modified in response to the newly established imposed dipolar pressure field of pumping. Under such a scenario, the pumped water becomes heated by both heat conduction and convection. FIG. 4 below shows an example of the convective or recirculation field (e.g., the convective recirculation cell 450) found in numerical simulations.

In some embodiments, the present disclosure provides a method that includes pumping heated water, via multiple extraction wells, from one or more extraction depths of an HSA. The method can further include transferring the heated water to an energy conversion unit, converting thermal energy to electric energy and resulting in cooled water. The method can further include pumping or re-injecting the cooled water, via multiple injection wells, back into an HSA beneath the surface (e.g., this water subsequently can become reheated in the HSA via conduction and convection) to one or more injection depths of an HSA. The method can further include determining, using comprehensive geologic data analyses, the permeability and/or porosity conditions that satisfy a threshold permeability and/or porosity. The method can further include determining, using comprehensive geologic data analyses, the thermal gradient, heat flux, and temperature that satisfy a necessary produced water temperature of 100° C. (e.g., for advanced organic Rankine cycle (ORC) power generation technologies) or lower (e.g., in the case of district heating). The method can further include generating a respective dipolar pumping pressure field between each pair of injection and extraction wells, where the dipolar pressure pattern imposes a pattern of fluid recirculation in the sedimentary aquifer, causing continual recharge of the geothermal system. The method can further include determining, using comprehensive numerical modeling, the optimum well configuration (e.g., depths of wells, lateral distances of wells, lengths of horizontal wells, orientations of wells, etc.) from which an economic multi-well geothermal system can be constructed.

In some embodiments, the present disclosure provides geothermal systems for extracting geothermal energy from thin, hot, and deeply buried sedimentary aquifers called HSAs that satisfy a certain threshold of geothermal characteristics. The geothermal systems disclosed herein may provide for extracting hot, superheated water by pumping the water to the surface via multiple extraction wells to an energy conversion unit on the surface that extracts energy from the hot water. As a result of the operation of this energy conversion unit, the heated water becomes cooled and is re-injected back into the original HSA beneath the surface via multiple injection wells. The geothermal systems disclosed herein may also provide for establishing a system of fluid convection or recirculation within the thin sedimentary aquifer using a differential pumping pressure between the extraction and injection wells of each well pair. Such convection can be a fundamental feature of the geothermal systems disclosed herein and can substantially enhance the longevity of these geothermal systems, allowing them to persist much longer than other manmade geothermal systems.

Definitions

Unless defined otherwise, all technical and scientific terms used herein can have substantially the same meaning as commonly understood by one of ordinary skill in the art to which the disclosure pertains. The following definitions supplement those in the art and are directed to the current application and are not to be imputed to any related or unrelated case, e.g., to any commonly owned patent or application. The terminology used herein is for the purpose of describing particular embodiments only, and is not intended to be limiting.

As used in this specification and the appended claims, the singular forms "a," "an" and "the" include plural referents unless the context clearly dictates otherwise. Thus, for example, reference to "an attribute" includes a plurality of such attributes, and the like.

The term "about" as used herein indicates the value of a given quantity varies by +10% of the value. For example, a thickness of "about 500 meters" can encompass a range of thicknesses from 450 meters to 550 meters, inclusive.

Spatially relative terms, such as "beneath," "below," "lower," "above," "on," "upper" and the like, may be used herein for ease of description to describe one element or feature's relationship to another element(s) or feature(s) as illustrated in the figures. The spatially relative terms are intended to encompass different orientations of the element(s) or feature(s) in use or operation in addition to the orientation(s) depicted in the figures. The element(s) or feature(s) can be otherwise oriented (e.g., rotated 90 degrees or at other orientations) and the spatially relative descriptors used herein may likewise be interpreted accordingly.

The term "natural enhanced geothermal system (NAT-EGS)" and "geothermal convective power cell (geo power cell or GPC)" refer to systems for harvesting geothermal energy from hot sedimentary aquifers without hydraulic fracturing by generating convection cells between a production well and an injection well. As used herein, the term NAT-EGS is synonymous with the term GPC.

The term "characteristic" or "geologic characteristic" can refer to a property, such as a rock property or a seismically-determined property, that is present at substantially all locations in the geologic volume (e.g., penetrative). The rock property can include density, porosity, permeability, and other suitable rock properties. The seismically-determined property can include velocity, Young's modulus, and other suitable seismically-determined properties.

The term "permeability" can refer to the various geologic characteristics that form the bulk permeability of a geologic volume, such as an HSA. These geologic characteristics can include, but are not limited to, the permeability of the rock itself, the distribution and degree of existing fractures in the formation, and any new fractures that are induced (e.g., via acid and/or energetics) to increase and/or enhance the bulk permeability of the geologic volume.

In some embodiments, the term "fracture" or "natural fracture" can refer to any non-sedimentary mechanical discontinuity thought to represent a surface or zone of mechanical failure. Chemical processes such as solution and stress corrosion may have played an important role in the fracture process. The term "fracture" can be used to describe a natural feature either when available evidence is inadequate for exact classification or when distinction between fracture types is unimportant. In some embodiments, faults are types of fractures. In some embodiments, an "induced fracture" can refer to any rock fracture produced by human activities, such as drilling, accidental or intentional hydrofracturing, core handling, and other activities.

In some embodiments, the term "machine learning" can refer to multivariate-statistics, neural networks, deep neural networks, and other suitable techniques, and any combination thereof. Accordingly, the term "machine learning" as used herein can include all possible correlation methods including multivariate statistics and neural networks.

The term "hot sedimentary aquifer (HSA)" can refer to a sedimentary rock stratum or sequence of strata filled with water (e.g., fresh, saline, or brine) that is sufficiently hot and that has sufficient porosity and permeability to be an economical source of geothermal energy. The term "thick-bed HSA" can refer to an HSA having a thickness between about 100 meters and 500 meters or more. The term "thin-bed HSA" can refer to an HSA having a thickness equal to or less than about 100 meters.

Example Geothermal Systems

FIG. 1 is a schematic diagram of an example implementation of an example natural geothermal system 100, according to some embodiments. In some embodiments, the natural geothermal system 100 may be a NAT-EGS configured to extract heat from an HSA. In some embodiments, one or more of the operations described below with reference to FIG. 1 may be performed or otherwise carried out by one or more components of the computer system 1300.

As shown in FIG. 1, a power unit 110 (e.g., an above-ground power plant or other type of geothermal energy processing or utilization facility) associated with the natural geothermal system 100 is positioned on a surface 102 of a location that is above, over, or near a geologic volume 104 that includes an HSA 106. The natural geothermal system 100 includes multiple extraction wells, such as an extraction well 120 with an extraction lateral 118. The natural geothermal system 100 further includes multiple injection wells, such as an injection well 112 with an injection lateral 114. The multiple extraction wells and the multiple injection wells may have been drilled to various depths of the HSA 106 and may be either vertically aligned or horizontally separated.

In some embodiments, the power unit 110 may include a pump system, a power generation unit (e.g., including, but not limited to, an energy capture unit and an energy conversion unit to convert geothermal energy to mechanical energy, electrical energy, any other suitable form of energy, or any combination thereof), and a regulatory device to control the natural geothermal system 100. For example, the regulatory device may control one or more extraction pumps (e.g., one pump per extraction well, or a common pump for two or more extraction wells) to extract water from the HSA 106 via the multiple extraction wells (e.g., including, but to limited to, the extraction well 120). In another example, the regulatory device may control the power generation unit to capture and process geothermal energy from the heated water, resulting in cooled water. In still another example, the regulatory device may control one or more injection pumps (e.g., one pump per injection well, or a common pump for two or more injection wells) to inject the cooled water from the power generation unit into the HSA 106 via the multiple injection wells (e.g., including, but to limited to, the injection well 112). In some embodiments, a single pump may be used for the plurality of wells. Alternatively, each well that is drilled can have its own pump and pumping system. Each pump can then be controlled by the regulatory device to balance the flow rates, pressures, and temperatures that are flowing to and from the power unit 110 to and from the multiple well system.

In some embodiments, such as when the HSA 106 is underpressured (e.g., as in the Lyons formation shown in FIG. 10), the injection well pump can be smaller than the extraction well pump. In some embodiments, each well pair can transfer heat in an individual way to the power unit 110 (e.g., an ORC system) such that the same water extracted from the HSA 106 can be pumped back into the same well pair and not cool parts of the HSA 106 in an uneven way. In some embodiments, the power unit 110 may be configured based on a determined optimum range of water injection rate in the multiple injection wells and/or water extraction rate of the multiple extraction wells can produce about 25 to 500 megawatts of power or more. Further, the flow rate of the water (e.g., as indicated by water flow 116) can be tuned (e.g., over time) via pumping adjustments to achieve a best possible efficiency for the natural geothermal system 100 according to the characteristics of the HSA 106.

Regarding the terrain of the natural geothermal system 100 (e.g., as indicated by geologic volume 104), the surface 102 may correspond to a ground or soil surface, a water surface (e.g., a lake surface, ocean surface, river surface), or any other suitable type of surface of the Earth. The HSA 106 can be disposed beneath the surface 102 (e.g., beneath the power unit 110) and may include any suitable type of fresh or salt-water bearing sedimentary rock. In some embodiments, the HSA 106 may be configured above and/or between one or more layers of igneous rock.

In some embodiments, the location of the surface 102 may be selected for the power unit 110 based on one or more geothermal characteristics of the HSA 106. For example, the location of the surface 102 may be selected based on determining that the HSA 106 is at a suitable, manageable, and/or accessible depth and includes a sufficient volume of water at a sufficiently high temperature, to determine whether the HSA 106 can efficiently be used to capture geothermal energy from the Earth. The HSA 106 (and/or geothermal characteristics of the HSA 106) may initially be identified and/or analyzed from drilling and sampling the terrain beneath the surface 102. Additionally or alternatively, the HSA 106 may be identified and/or analyzed from seismic imaging data (e.g., mapping data, imaging data, the parameters listed above with reference to the geologic volume parameterization system 130) associated with the terrain beneath the surface 102. The seismic imaging data may be obtained and/or captured in real-time and/or may correspond to historical data associated with previous seismic imaging and/or previously created well bores associated with previous operations, analyses, and/or geological mappings of the terrain beneath the surface 102.

In some embodiments, the geothermal characteristic of the HSA 106 may correspond to one or more characteristics of the HSA 106 that would enable a desired amount of geothermal energy to be extracted from the Earth at a particular rate, for a particular period of time, or both. Such geothermal characteristics may be based on certain physical characteristics of the HSA 106 (e.g., depth, thickness, porosity, permeability, temperature of the HSA 106, and/or pressure and/or composition of water within the HSA 106).

In some implementations, one of the geothermal characteristics of the HSA 106 that may be considered when selecting the location of the surface 102 for the power unit 110 may include a measured or determined heat flow between various depths of the HSA 106. The heat flow may indicate and/or represent an amount of heat or geothermal energy that can be captured from the HSA 106 during a particular time period. The heat flow may be based on the geothermal gradient and determines the temperature of the water at various depths of the HSA 106. Accordingly, the heat flow can be determined (e.g., estimated) based on certain characteristics and/or measurements associated with the HSA 106.

Another geothermal characteristic may include or be associated with permeability of the HSA 106. The permeability of the HSA 106 may indicate the rate at which water can be extracted from the HSA 106. Correspondingly, in combination with temperatures of the HSA 106 (e.g., at various depths of the HSA 106), the amount of heat or geothermal energy that can be extracted from the HSA 106 can be determined. The permeability of the HSA 106 may be determined based on various tests conducted in the associated drill holes into the HSA 106 and, in some embodiments, further based on the terrain of the HSA 106. According to some implementations, a construction lateral can be drilled between or beyond the injection lateral 114 and the extraction lateral 118 to perform an operation to improve the permeability of the HSA 106. For example, construction lateral(s) can be drilled outside of the injection/extraction lateral plane to increase the permeability of the region surrounding the well pair(s) to stimulate increased convective flow into the system from the region beyond the well pair (e.g., also referred to as "the far field"). In another example, construction lateral(s) may be drilled and configured to inject acidic water and/or pressurized water (and/or an energetic or propellant, such as an ignitable liquid or solid fuel) to increase the bulk permeability of the HSA 106, thereby improving the permeability between each injection lateral 114 and extraction lateral 118. In such cases, the permeability of the HSA 106 may satisfy a permeability threshold associated with permitting the construction lateral to be drilled. In some embodiments, such a threshold permeability may be greater than a permeability threshold to use the HSA 106 without performing enhancement operation to increase the permeability of the HSA 106 to configure the natural geothermal system 100.

Yet another geothermal characteristic may include or be associated with a porosity of the HSA 106, which can indicate of the volume of water held by the HSA 106. The porosity may indicate or be used to identify the permeability and enable a determination of a flow rate of water through the HSA 106, an amount of water that can be received within the HSA 106 after being processed by the power unit 110 (e.g., to determine an injection rate of a flow of water via the injection well 112).

Such geothermal characteristics may be compared against corresponding thresholds of the geothermal characteristics to determine whether the HSA 106 is suitable for capturing a desired amount of geothermal energy (e.g., corresponding to enough energy to permit the power unit 110 to output a desired amount of power for an area or region of the location of the surface 102) for a desired period of time (e.g., 10-20 years, or even over 50 years). In some embodiments, the thresholds may include a minimum heat flow rate into the HSA 106, a minimum permeability of the HSA 106, a minimum porosity of the HSA 106, any other suitable threshold, or any combination thereof. Additionally or alternatively, certain physical characteristics of the HSA 106 associated with geothermal characteristics of the HSA 106 may be considered (e.g., a minimum or maximum depth of the HSA 106, a minimum or maximum thickness of the HSA 106, a minimum temperature of the HSA 106).

In some embodiments, the natural geothermal system 100 may use the HSA 106 that has a sufficiently high background basal heat flux and is sufficiently large enough (e.g., has a sufficient volume, thickness) to supply geothermal energy for ten years or more. In some locations of the Earth, such an injection depth of the HSA 106 may be at a minimum of 1,500 meters below the surface 102, and/or such an extraction depth of the HSA 106 may be at a minimum of 1,000 meters. In such an example, any recirculated water that was injected via the multiple injection wells and is extracted via the multiple extraction wells reaches the threshold temperature of at least 100° C. For higher levels of basal heat flux, the minimum depth becomes correspondingly less.

In some embodiments, after the location of the surface 102 is selected for the power unit 110, the natural geothermal system 100 may be configured and/or designed according to the characteristics of the HSA 106. For example, as shown, the injection well 112 and the extraction well 120 may be part of a disjointed, multi-well system connected to the power unit 110 in that heated water is to be extracted from the HSA 106 at an extraction depth and cooled water (which is created from capturing heat from the heated water) is to be injected at an injection depth of the HSA 106. In some embodiments, based on the geothermal characteristics of the HSA 106 and the desired amount of geothermal energy that is to be captured from the HSA 106, the extraction depth and injection depth (and, correspondingly, the vertical distance 122 between the extraction depth of the extraction lateral 118 and the injection depth of the injection lateral 114), as well as the extraction location and the injection location (and, correspondingly, the horizontal distance 123 between the extraction well 120 and the injection well 112), can be determined to provide a desired water flow rate and/or energy extraction rate for a desired period of time that the power unit 110 is to be operable to provide power. As a result, the extraction well 120 and the injection well 112 may be offset laterally, vertically, or both laterally and vertically.

In some implementations, the cooled water can be supplied with a supplemental agent to facilitate flow of available water through the HSA 106, as indicated by water flow 116. The supplemental agent can include, for example, a propellant-based agent (e.g., rocket fuel), a solvent or solute (e.g., a hydrochloric acid such as muriatic acid; a sulfuric acid; or any other suitable material for performing acid leaching), any other suitable agent, or any combination thereof. When injected into the HSA 106 via the injection well 112 (along with the cooled water), the supplemental agent can increase permeability and/or porosity of the HSA 106 (by causing erosion or breakdown of some of the rock or material of the HSA 106). In this way, the natural geothermal system 100, using the supplemental agent, can improve geothermal energy extraction via the HSA 106.

In some embodiments, geothermal energy can be obtained, by the power unit 110 and from the HSA 106, by pumping heated water from the HSA 106 via the multiple extraction wells, extracting heat from the heated water to capture energy, resulting in cooled water, and injecting the cooled water back into the HSA 106 via the multiple injection wells. In some embodiments, the power unit 110 can generate a power output between about 25 megawatts and 500 megawatts. For example, the power unit 110 may generate a power output of about 20 megawatts using only the extraction well 120 and the injection well 112. In contrast, the power unit 110 may generate a power output between about 25 megawatts and 500 megawatts or more using multiple extraction wells and multiple injection wells (e.g., including, but not limited to, the extraction well 120 and the injection well 112) as described herein. In some embodiments, the multiple extraction wells and the multiple injection wells may be formed according to a wagon-wheel pattern (e.g., as described with reference to FIG. 6), a wine-rack pattern (e.g., as described with reference to FIG. 7), a gun-barrel pattern (e.g., as described with reference to FIGS. 8A and 8B), a chicken-foot pattern (e.g., as described with reference to FIG. 9), a vertically-stacked pattern (e.g., as described with reference to FIG. 10), any other suitable pattern or arrangement, or any combination thereof.

Figure 2:
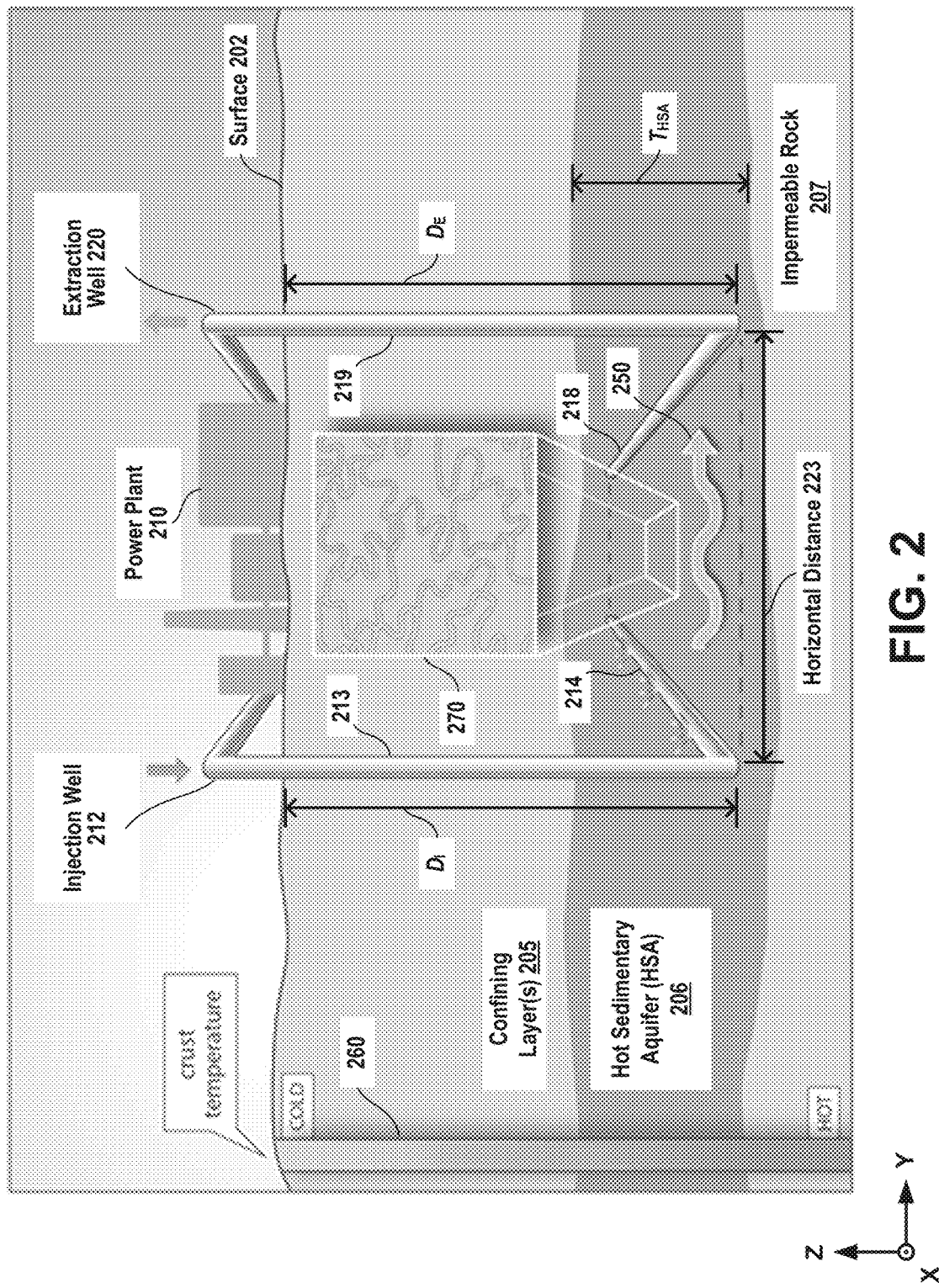
FIG. 2 is a schematic diagram of an example natural enhanced geothermal system (NAT-EGS), according to some embodiments.

FIG. 2 is a schematic diagram of an example implementation of an example NAT-EGS 200 (e.g., a GPC) in a thin sedimentary aquifer, according to some embodiments. In some embodiments, one or more of the operations described below with reference to FIG. 2 may be performed or otherwise carried out by one or more components of the computer system 1300.

As shown in FIG. 2, the NAT-EGS 200 can include a power plant 210 that includes a power generation unit, a pump system, and a well system disposed within an HSA 206. In some embodiments, the HSA 206 can be disposed above an impermeable rock 207.

The well system can include multiple extraction wells, such as an extraction well 220, that enable the pump system to provide heated water at one or more extraction depths, such as an extraction depth $D_E$, of the HSA 206 to the power generation unit. The extraction well 220 can include a production element that includes an extraction pump, an extraction lateral 218 disposed within the HSA 206 at the extraction depth $D_E$, and a vertical extraction component 219 extending between the extraction depth $D_E$ and the power generation unit.

The well system can further include multiple injection wells, such as an injection well 212, that enable the pump system to inject cooled water from the power generation unit into the HSA 206 at one or more injection depths, such as an injection depth $D_I$. The injection well 212 can include an injection element that includes an injection pump, an injection lateral 214 disposed within the HSA 206 at the injection depth $D_I$, and a vertical injection component 213 extending between the injection depth $D_I$ and the power generation unit.

In some embodiments, a horizontal distance 223 (e.g., along the Y-axis as shown in FIG. 2) between the injection lateral 214 and the extraction lateral 218 can be equal to or greater than about 300 meters. In some aspects, the horizontal distance 223 between the extraction lateral 218 and the injection lateral 214 can be equal to or greater than about 500 meters.

In some embodiments, the HSA 206 may be a thin-bed HSA. In some aspects, a thickness $T_{HSA}$ of the HSA 206 can be equal to or less than about 100 meters, and a depth difference $\Delta D$ between the extraction depth $D_E$ and the injection depth $D_I$ (where $\Delta D=|D_I-D_E|$) can be equal to or less than about the thickness $T_{HSA}$ of the HSA 206 (e.g., $\Delta D$ can be less than or equal to about 100 meters, 75 meters, 50 meters, 25 meters, 10 meters, etc.). In some aspects, the thickness $T_{HSA}$ of the HSA 206 can be equal to or less than about 50 meters, and the depth difference $\Delta D$ between the extraction depth $D_E$ and the injection depth D can be equal to or less than about the thickness $T_{HSA}$ of the HSA 206 (e.g., ΔD can be less than or equal to about 50 meters, 40 meters, 30 meters, 20 meters, 10 meters, etc.). In some aspects, the depth difference ΔD may be determined according to the geothermal characteristics of the HSA 206 and may be on the order of 100 meters or less, as described herein.

As shown in FIG. 2, the injection wells and the extraction wells can be L-shaped in that the injection well 212 and the extraction well 220 each have vertical elements (e.g., vertical components) and horizontal elements (e.g., laterals). For example, the extraction well 220 may have a production element (e.g., which may include a vertical extraction component 219) that extends between the extraction depth $D_E$ and the surface 202 (and/or the power plant 210 on a surface 202 above the HSA 206) and the extraction lateral 218 that is laterally drilled at the extraction depth $D_E$. The extraction lateral 218 (e.g., which may include a horizontal perforated pipe) may be mechanically coupled (e.g., physically attached to, physically fastened to, fluidly coupled, and/or the like) to the production element. Accordingly, the extraction lateral 218 may laterally branch out from the production element at the extraction depth $D_E$. Furthermore, the injection well 212 may have the injection element that extends between the injection depth $D_I$ and the surface 202 and the injection lateral 214. The injection lateral 214 may be mechanically coupled to the injection element, and laterally branch out from the injection element at the injection depth $D_I$. The extraction lateral 218 and the injection lateral 214 can be substantially parallel (e.g., within an industry standard threshold of parallel) to one another and substantially vertically aligned (e.g., within an industry standard threshold of vertical). Accordingly, a substantially horizontal heat zone aligned with the induced natural lateral flow of hot water (e.g., as indicated by the reference arrow 250) can be formed within the HSA 206 between the extraction lateral 218 and the injection lateral 214 and in the region surrounding them.

In some embodiments, as shown in FIG. 2, the injection depth $D_I$ can be substantially the same as the extraction depth $D_E$. In other embodiments, the injection depth $D_I$ can be substantially deeper than the extraction depth $D_E$. In still other embodiments, depending upon the terrain, the extraction depth $D_E$ can be deeper than the injection depth $D_I$. In such embodiments where the depth difference ΔD between the extraction depth $D_E$ and the injection depth $D_I$ is substantially non-zero, the configuration of the injection well 212 and the extraction well 220 (which may be referred to collectively herein as "the wells") can be "disjointed" in that the wells can be drilled to different depths substantially without creating manmade fractures or openings directly connecting the wells (e.g., between the extraction lateral 218 of the extraction well 220 and the injection lateral 214 of the injection well 212). For example, the terrain of the HSA 206 between the injection well 212 and the extraction well 220 can have a sufficient permeability to create a substantially uninhibited lateral flow of water between the wells, as indicated by reference arrow 250.

In some embodiments as shown in FIG. 1, when the thickness of the HSA 106 is adequately thick, the extraction lateral 118 and the injection lateral 114 can be located vertically above one another at the bottom (e.g., injection well 112) and top (e.g., extraction well 120) of the HSA 106 without lateral offsetting. In contrast, in some embodiments as shown in FIG. 2, when the sedimentary layer is thin (e.g., the thickness $T_{HSA}$ of the HSA 206 is not adequately thick), the extraction lateral 218 and the injection lateral 214 can be located horizontally offset from each other (e.g., horizontal distance 223 can be non-zero). Such a geometrical setting can generate a fluid convection or recirculation system within the HSA 206.

Referring again to FIG. 2, the well system can further include a regulatory device configured to generate a set of first control signals configured to instruct the pump system to pump the heated water from the extraction wells (e.g., including, but not limited to, the extraction well 220) to the power generation unit. In some embodiments, the set of first control signals can be further configured to instruct the pump system to pump, via the extraction wells, the heated water from the one or more extraction depths (e.g., including, but not limited to, the extraction depth $D_E$) of the HSA 206 at an extraction rate that stimulates a flow field that provides a recharge of the extracted heat. The regulatory device can be further configured to generate a second control signal configured to instruct the power generation unit to extract thermal energy from the heated water and to transform the heated water into cooled water. The regulatory device can be further configured to generate a set of third control signals configured to instruct the pump system to pump the cooled water from the power generation unit to the injection wells (e.g., including, but not limited to, the injection well 212).

In some embodiments, the set of third control signals can be further configured to instruct the pump system to inject the cooled water with a supplemental agent to enhance a permeability, a porosity, or both of the HSA 206. In such embodiments, the permeability may not satisfy a threshold permeability range before an injection of the cooled water with the supplemental agent, and the permeability can satisfy the threshold permeability range after the injection of the cooled water with the supplemental agent. In some embodiments, the supplemental agent can include an energetic or propellant-based agent, including, but not limited to, an ignitable solid or liquid fuel and/or any other materials and methods to enhance the permeability of the HSA 206. In other embodiments, the supplemental agent can include materials including, but not limited to, a muriatic acid, a hydrochloric acid, and/or any other materials and methods to enhance the permeability of the HSA 206.

As shown by magnified view 270, the HSA 206 may include a plurality of channels that permit water within the HSA 206 to flow through the HSA 206 from the injection well 212 to the extraction well 220, as shown by reference arrow 250. During operation, the injection well 212 can be used to release a certain amount of cooled water at the injection depth $D_I$ in a region of the HSA 206, and the extraction well 220 can be used to harvest heated water in another region of the HSA 206. Accordingly, as indicated by hot/cold scale 260 and the shading of channels shown in magnified view 270 of the HSA 206, the temperature of the water flowing laterally between in the injection well 212 and the extraction well 220 can be relatively cooler toward the injection well 212 and relatively warmer toward the extraction well 220 due to the configuration of the NAT-EGS 200 and geothermal characteristics of the HSA 206. Correspondingly, as illustrated by the shading of the reference arrow 250, the water in the HSA 206 can be heated as the water permeates or flows laterally from the injection depth $D_I$ to the extraction depth $D_E$.

Using the NAT-EGS 200, water can be cycled through the HSA 206. For example, injected cooled water in a first region of the HSA 206 can be exposed to heated material (e.g., sand, rocks, and/or the like) and heated water within the HSA 206. More specifically, as the cooled water traverses or is infused within the HSA 206, the cooled water is warmed via conduction, convection, advection, or a combination thereof. As heated water is pumped from the extraction well 220 in a second region of the HSA 206, the injected water circulates within the HSA 206 to replace the extracted water. As the energy or heat is harvested from the extracted water, which is now relatively cooler, the cooled water is then reinjected into the first region of the HSA 206 via the injection well 212. That cooled water can again be heated as it circulates and mingles with other waters eventually to be harvested throughout one or more cycles. By this technique, a large-scale convective or circulation system can be established within the greater surrounding HSA 206 environment between the extraction well 220, the power plant 210, the injection well 212, and the HSA 206. As a result, in the NAT-EGS 200, heat is provided mainly by widespread, natural advection or convection of super-heated water in the deep sedimentary aquifer over a volume of HSA 206 material surrounding the specific wells and thus a longer (e.g., greater than 10 years, 20 years, 50 years, etc.) and more continuous production of energy can be maintained substantially without the potential of environmental hazard (e.g., from fracking techniques).

In some embodiments, the NAT-EGS 200 may have a longer useful life (e.g., 10-20 years, or even over 50 years or more) due to the geothermal characteristics of the HSA 206 (many of which are located throughout the Earth). Further, the NAT-EGS 200 may be substantially maintenance free during the extended duration and useful life of the NAT-EGS 200 because the heat source (e.g., the HSA 206) does not have to be maintained (e.g., no fractures may need to be cleared of debris and/or reopened to maintain a desired flow if the fractures collapse). Moreover, within the source volume of the HSA 206 (e.g., laterally between the drill holes), there are no pipes or artificial or manufactured pathways that may need maintenance.

In some embodiments, the NAT-EGS 200 can provide a large-scale recharge of the HSA 206 via circulatory movement of water and heat through the HSA 206 that is induced by the pressure field and temperature gradient associated with pumping water from the extraction well 220 and back into the HSA 206 via the injection well 212. For example, water from areas that are not within regions surrounding the wells can be pulled into the heat zone between the wells via the circulatory movement. Thus, water in regions of the HSA 206 around the wells can be continuously and naturally reheated by the higher temperature of sedimentary rocks throughout the HSA 206. Furthermore, a combined effect of heated, low density water being extracted from one region of the HSA 206, and cooled denser water, having been run through the power plant, being injected into another region of the HSA 206 functions, in effect, as a thermal flywheel to sustain the circulation.

In some embodiments, the HSA 206 and additional HSAs can be selected based on a predicted power output for the power generated by the power plant 210 (e.g., also referred to as "generated power," "captured geothermal energy," and "extracted thermal energy") that satisfies a threshold power generation requirement of the power plant 210 (e.g., a power output required to power a data center, oil and gas field, corporate campus, governmental facility, small town, etc.). In some embodiments, the quantity of well pairs (e.g., two well pairs, six well pairs, ten well pairs, etc.) can be selected such that the generated power satisfies the threshold power generation requirement. In some embodiments, if the threshold power generation requirement increases, the quantity of well pairs can be increased as well (e.g., by drilling additional well pairs in the HSA 206 or in a different HSA).

In some embodiments, the power plant 210 can generate a power output equal to or greater than about 25 megawatts, 50 megawatts, 100 megawatts, 250 megawatts, 500 megawatts, or any other suitable power output. For example, the power generation unit of the power plant 210 may generate a power output of about 20 megawatts using only the extraction well 220 and the injection well 212. In contrast, the power generation unit of the power plant 210 may generate a power output of about 25 to 500 megawatts or more using multiple extraction wells and multiple injection wells as described herein. In some embodiments, the multiple extraction wells and the multiple injection wells may be formed according to a wagon-wheel pattern (e.g., as described with reference to FIG. 6), a wine-rack pattern (e.g., as described with reference to FIG. 7), a gun-barrel pattern (e.g., as described with reference to FIGS. 8A and 8B), a chicken-foot pattern (e.g., as described with reference to FIG. 9), a vertically-stacked pattern (e.g., as described with reference to FIG. 10), any other suitable pattern or arrangement, or any combination thereof.

Figure 3:
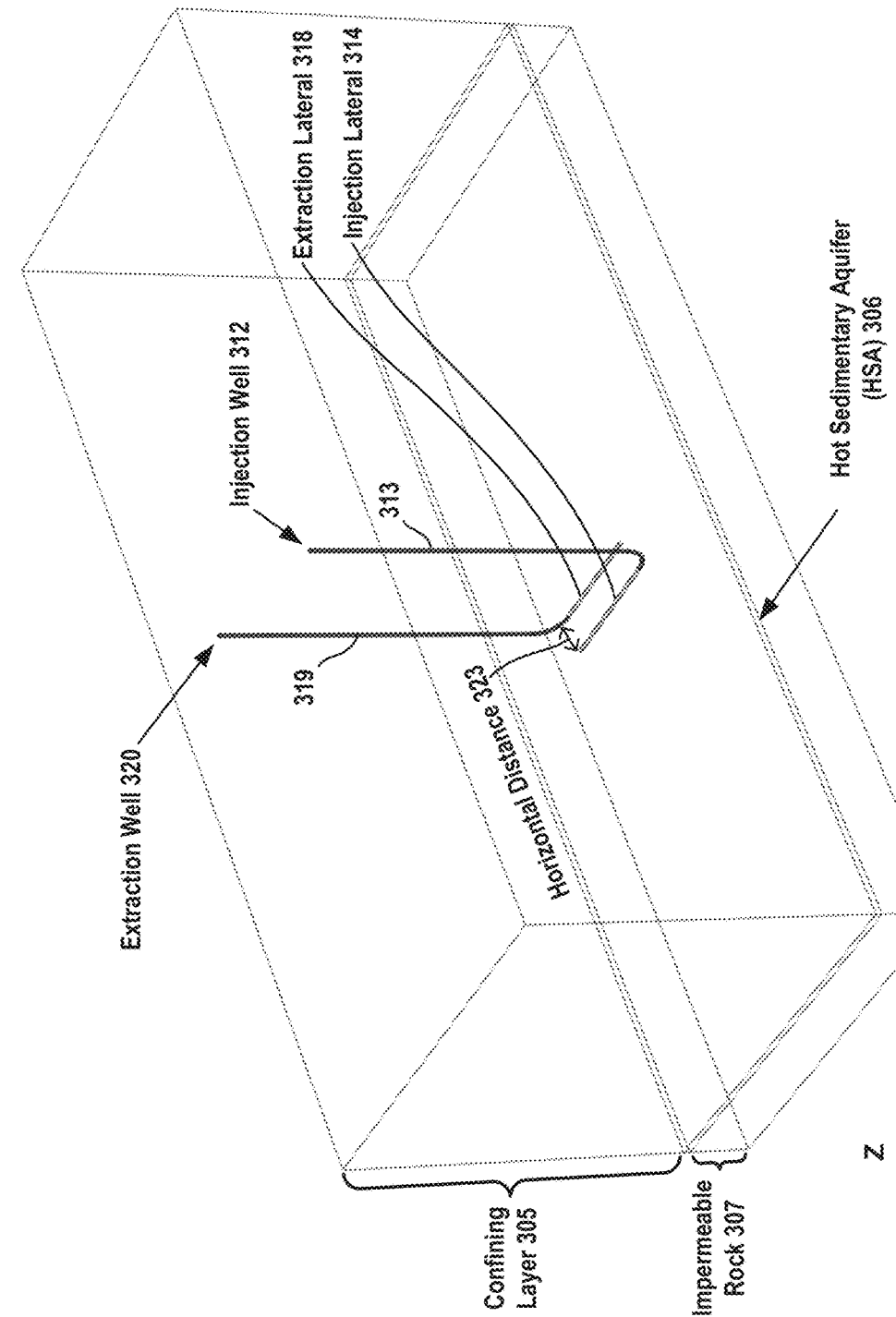
FIG. 3 is a schematic diagram of an example numerical simulation domain of an example NAT-EGS, according to some embodiments.

FIG. 3 illustrates an example numerical modeling domain (e.g., various geologic layers, well configuration and distancing, etc.) that has been used to simulate the full operation of an example NAT-EGS 300, according to some embodiments. In some embodiments, one or more of the operations described below with reference to FIG. 3 may be performed or otherwise carried out by one or more components of the computer system 1300.

As shown in FIG. 3, the NAT-EGS 300 can include an extraction well 320 having a production element that includes an extraction pump, a vertical extraction component 319, and an extraction lateral 318 laterally drilled at an extraction depth and disposed within an HSA 306 (e.g., a thin-bed HSA). NAT-EGS 300 can further include an injection well 312 having an injection element that includes an injection pump, a vertical injection component 313, and an injection lateral 314 laterally drilled at an injection depth and disposed within the HSA 306. The HSA 306 can be disposed below a confining layer 305 and above an impermeable rock 307. The geophysical characteristics of each of the confining layer 305, the HSA 306 and the impermeable rock 307 have been determined via geologic data analysis including direct drilling.

In the example numerical modeling domain, the HSA 306 is relatively thin, about 50 meters, and located at a depth of about 2,800 meters below the surface. The pumping system that controls the extraction of hot water and re-injection of cooled water can be controlled on the surface. For example, the extraction pump can be downhole but controlled on the surface. Alternatively, the HSA 306 can be pressurized and the extraction pump can be located on the surface. The horizontal distance 323 between the extraction lateral 318 and the injection lateral 314 (e.g., well spacing) has an important impact on the efficiency and longevity of the NAT-EGS 300 and may be different from case to case, not necessarily parallel to one another, and distinctly crafted to each specific geologic situation.

FIG. 4 illustrates the results of an example numerical simulation of the full operation of an example NAT-EGS 400 using the example numerical modeling domain described with reference to FIG. 3, according to some embodiments. In some embodiments, one or more of the operations described below with reference to FIG. 4 may be performed or otherwise carried out by one or more components of the computer system 1300.

As shown in FIG. 4, the NAT-EGS 400 can include an extraction well 420 having a production element that includes an extraction pump, a vertical extraction component 419, and an extraction lateral 418 laterally drilled at an extraction depth and disposed within an HSA 406 (e.g., a thin-bed HSA). NAT-EGS 400 can further include an injection well 412 having an injection element that includes an injection pump, a vertical injection component 413, and an injection lateral 414 laterally drilled at an injection depth and disposed within the HSA 406. The HSA 406 can be disposed below a confining layer 405 and above an impermeable rock 407. The geophysical characteristics of each of the confining layer 405, the HSA 406 and the impermeable rock 407 have been determined via geologic data analysis.

As shown in FIG. 4, the results of the example numerical simulation of the full operation of the example NAT-EGS 400 show a convective recirculation cell 450 induced within the HSA 406. In this numerical simulation, the HSA 406 was about 50 meters and located at a depth of about 2,800 meters below the surface, the extraction well 420 and the injection well 412 were parallel to each other, and the horizontal distance 423 between the extraction lateral 418 and the injection lateral 414 was 300 meters. Due to a dipolar pumping pressure, the convective recirculation cell 450 was formed which caused an aquifer-wide mixing of the injected water and existing water. Such convection caused recharging of the system and increased the longevity of the NAT-EGS 400. The arrows and lines in the convective recirculation cell 450 were calculated (e.g., extrapolated) values and showed that the flow field was still operating after 20 years.

Figure 5:
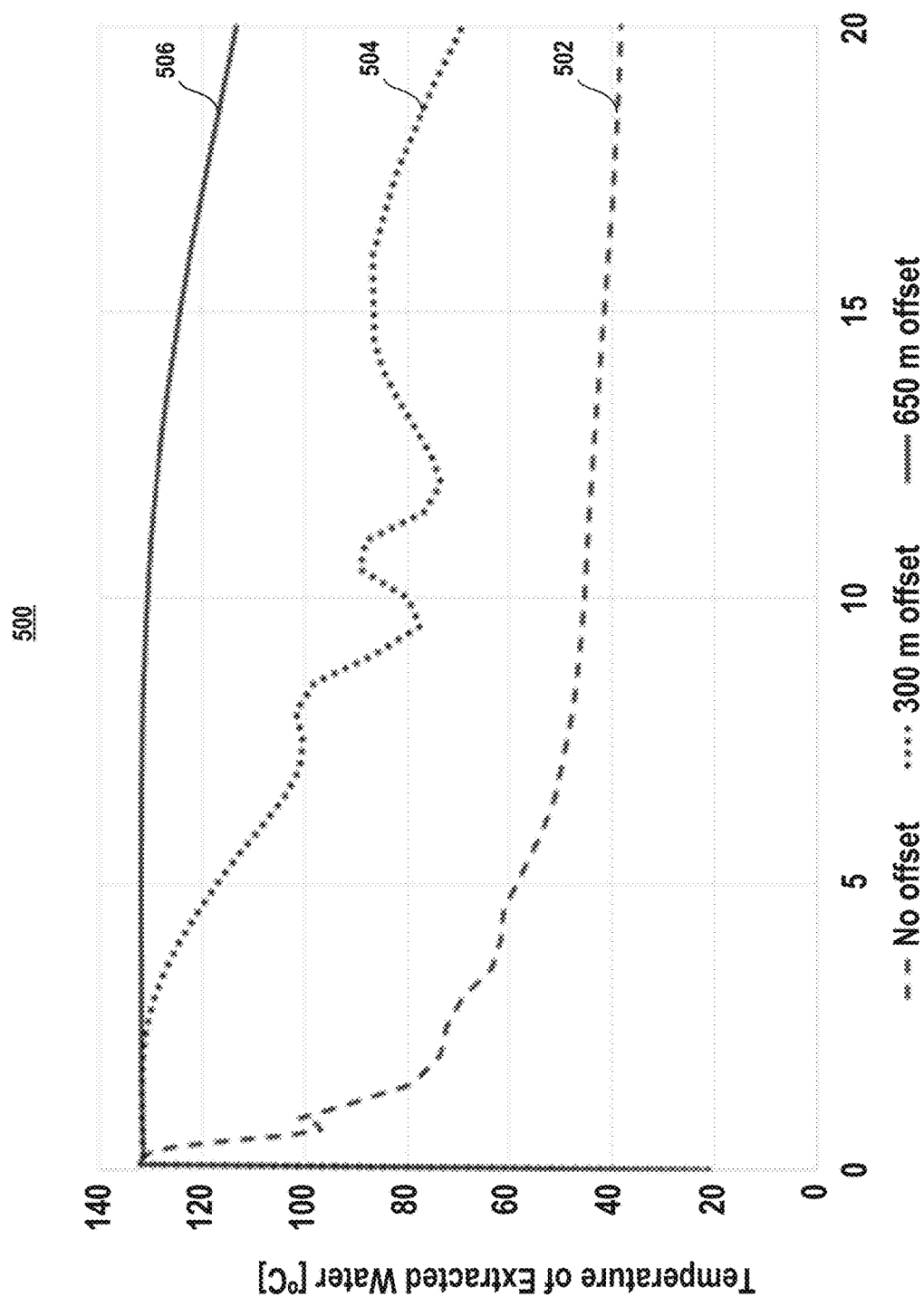
FIG. 5 shows an example graph associated with an example geothermal convective power cell process, according to some embodiments.

FIG. 5 shows an example graph 500 that demonstrates the impact of changing the spacing between the extraction and injection wells on the temperature of the extracted water in an example geothermal system, according to some aspects of the present disclosure. In some embodiments, one or more of the operations described below with reference to FIG. 5 may be performed or otherwise carried out by one or more components of the computer system 1300.

In some embodiments, determining the optimum offset spacing between the injection and extraction wells can improve the operation of the geothermal system because. (i) if the distance is too short, a quick chilling or short-circuiting of the geothermal system occurs; (ii) if the injection and extraction wells are too distant, a substantially large amount of pumping pressure is required and, additionally, the geologic setting might change undesirably over a larger scale. Accordingly, by using the state of the art finite element modeling, an optimum configuration of the injection and extraction wells can be fully determined for the most economic harvesting of Geothermal Energy.

As shown in FIG. 5, the example graph 500 illustrates the variation of the temperature of the extracted water over a period of 20 years as found in numerical simulations for three geometric configurations or offsets of the respective laterals of the extraction and injection wells: a no offset curve 502 (e.g., horizontal distance 223 between the injection lateral 214 and the extraction lateral 218=0 meters); a 300 meter offset curve 504 (e.g., horizontal distance 223=300 meters); and a 650 meter offset curve 506 (e.g., horizontal distance 223=650 meters). As the horizontal separation between the extraction and injection laterals increases, the cooling of the sedimentary aquifer is increasingly delayed with the result that the geothermal energy system is economically efficient for an increasingly long duration.

Figure 6:
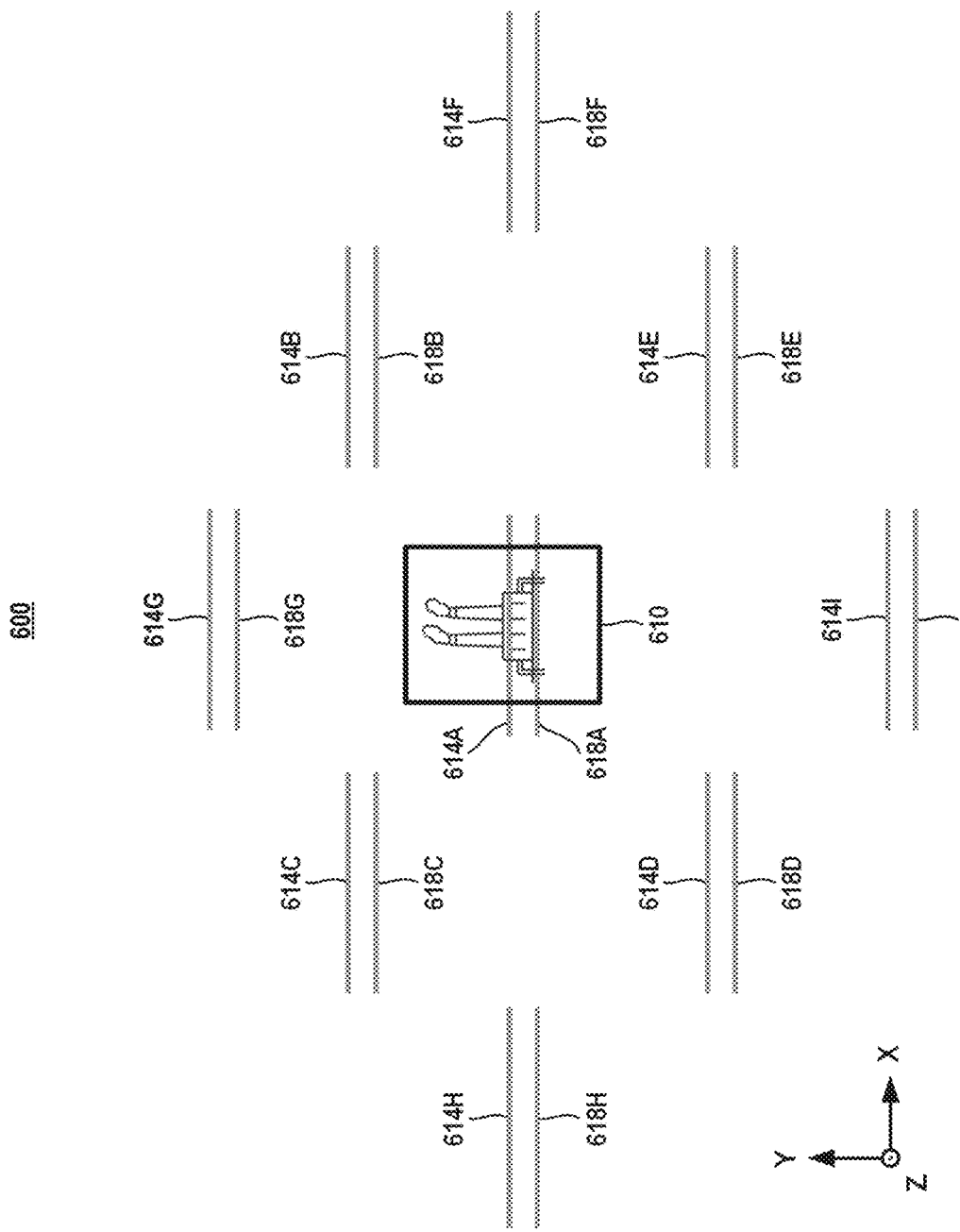
FIG. 6 is a schematic diagram of an example natural geothermal system having multiple pairs of extraction and injection wells formed according to a wagon-wheel pattern, according to some embodiments.

FIG. 6 is a schematic diagram of an overhead view of an example implementation of an example geothermal system 600 having multiple underground lateral well pairs disposed below a single power plant, according to some embodiments. In some aspects, the example geothermal system 600, or any portion thereof, can be implemented using any of the structures, components, features, or techniques described with reference to the example natural geothermal system 100 described with reference to FIG. 1; the example NAT-EGS 200 described with reference to FIG. 2; the example NAT-EGS 300 described with reference to FIG. 3; the example NAT-EGS 400 described with reference to FIG. 4; the example graph 500 described with reference to FIG. 5; the example geothermal system 700 described with reference to FIG. 7; the example geothermal system 800 described with reference to FIGS. 8A and 8B; the example geothermal system 900 described with reference to FIG. 9; the chart 1000 described with reference to FIG. 10; the method 1100 described with reference to FIG. 11; the method 1200 described with reference to FIG. 12; the example computing system 1300 described with reference to FIG. 13; any other suitable structure, component, feature, or technique; any portion thereof; or any combination thereof. In some embodiments, one or more of the operations described below with reference to FIG. 6 may be performed or otherwise carried out by one or more components of the computer system 1300.

As shown in FIG. 6, the example geothermal system 600 can include a power plant 610 that includes a power generation unit, a pump system, and a well system disposed within an HSA (e.g., a thin-bed HSA). In some embodiments, the HSA can be disposed above an impermeable rock.

The well system can include multiple extraction wells, such as extraction wells 618A-618I, that enable the pump system to provide heated water at one or more extraction depths of the HSA to the power generation unit. Each of the extraction wells 618A-618I can include a production element that includes an extraction pump, an extraction lateral disposed within the HSA at a respective one of the one or more extraction depths, and a vertical extraction component connecting the respective extraction lateral to the power generation unit.

The well system can further include multiple injection wells, such as injection wells 614A-614I, that enable the pump system to inject cooled water from the power generation unit into the HSA at one or more injection depths. Each of the injection wells 614A-614I can include an injection element that includes an injection pump, an injection lateral disposed within the HSA at a respective one of the one or more injection depths, and a vertical injection component connecting the respective injection lateral to the power generation unit. The extraction wells and the injection wells form two or more well pairs.

As shown in FIG. 6, the extraction wells 618A-618I and the injection wells 614A-614I may be formed according to a wagon-wheel pattern. For example, a first pair of wells can include the extraction well 618A and the injection well 614A whose laterals are disposed within a first region of the HSA. A second pair of wells can include the extraction well 618B and the injection well 614B whose laterals are disposed within a second region of the HSA. A third pair of wells can include the extraction well 618C and the injection well 614C whose laterals are disposed within a third region of the HSA. A fourth pair of wells can include the extraction well 618D and the injection well 614D whose laterals are disposed within a fourth region of the HSA. A fifth pair of wells can include the extraction well 618E and the injection well 614E whose laterals are disposed within a fifth region of the HSA. A sixth pair of wells can include the extraction well 618F and the injection well 614F whose laterals are disposed within a sixth region of the HSA. A seventh pair of wells can include the extraction well 618G and the injection well 614G whose laterals are disposed within a seventh region of the HSA. An eighth pair of wells can include the extraction well 618H and the injection well 614H whose laterals are disposed within an eighth region of the HSA. A ninth pair of wells can include the extraction well 618I and the injection well 614I whose laterals are disposed within a ninth region of the HSA.

The well system can further include a regulatory device configured to generate a set of first control signals configured to instruct the pump system to pump the heated water from the extraction wells 618A-618I to the power generation unit. In some embodiments, the set of first control signals can be further configured to instruct the pump system to pump, via the extraction wells 618A-618I, the heated water from the one or more extraction depths of the HSA at an extraction rate that stimulates a flow field that provides a recharge of the extracted heat. The regulatory device can be further configured to generate a second control signal configured to instruct the power generation unit to extract thermal energy from the heated water and to transform the heated water into cooled water. The regulatory device can be further configured to generate a set of third control signals configured to instruct the pump system to pump the cooled water from the power generation unit to the injection wells 614A-614I.

In some embodiments, the set of third control signals can be further configured to instruct the pump system to inject, via the injection wells 614A-614I, the cooled water with a supplemental agent to enhance a permeability, a porosity, or both of the HSA. In such embodiments, the permeability may not satisfy a threshold permeability range before an injection of the cooled water with the supplemental agent, and the permeability can satisfy the threshold permeability range after the injection of the cooled water with the supplemental agent. In some embodiments, the supplemental agent can include an energetic or propellant-based agent, including, but not limited to, an ignitable solid or liquid fuel and/or any other materials and methods to enhance the permeability of the HSA. In other embodiments, the supplemental agent can include materials including, but not limited to, a muriatic acid, a hydrochloric acid, and/or any other materials and methods to enhance the permeability of the HSA.

In some embodiments, the example geothermal system 600 can provide a large-scale recharge of the HSA via circulatory movement of water and heat through the HSA that is induced by the pressure field and temperature gradient associated with pumping water from the extraction wells 618A-618I and back into the HSA via the injection wells 614A-614I. For example, water from areas that are not within regions surrounding each pair of wells can be pulled into the heat zone between the pair of wells via the circulatory movement. Thus, water in regions of the HSA around the well pairs can be continuously and naturally reheated by the higher temperature of sedimentary rocks throughout the HSA.

In some embodiments, the power plant 610 can generate a power output of about 25 to 500 megawatts. For example, the power generation unit of the power plant 610 may generate a power output of about 20 megawatts using only the extraction well 618A and the injection well 614A. In contrast, the power generation unit of the power plant 610 may generate a power output of about 25 to 500 megawatts using the extraction wells 618A-618I and the injection wells 614A-614I as described herein.

Figure 7:
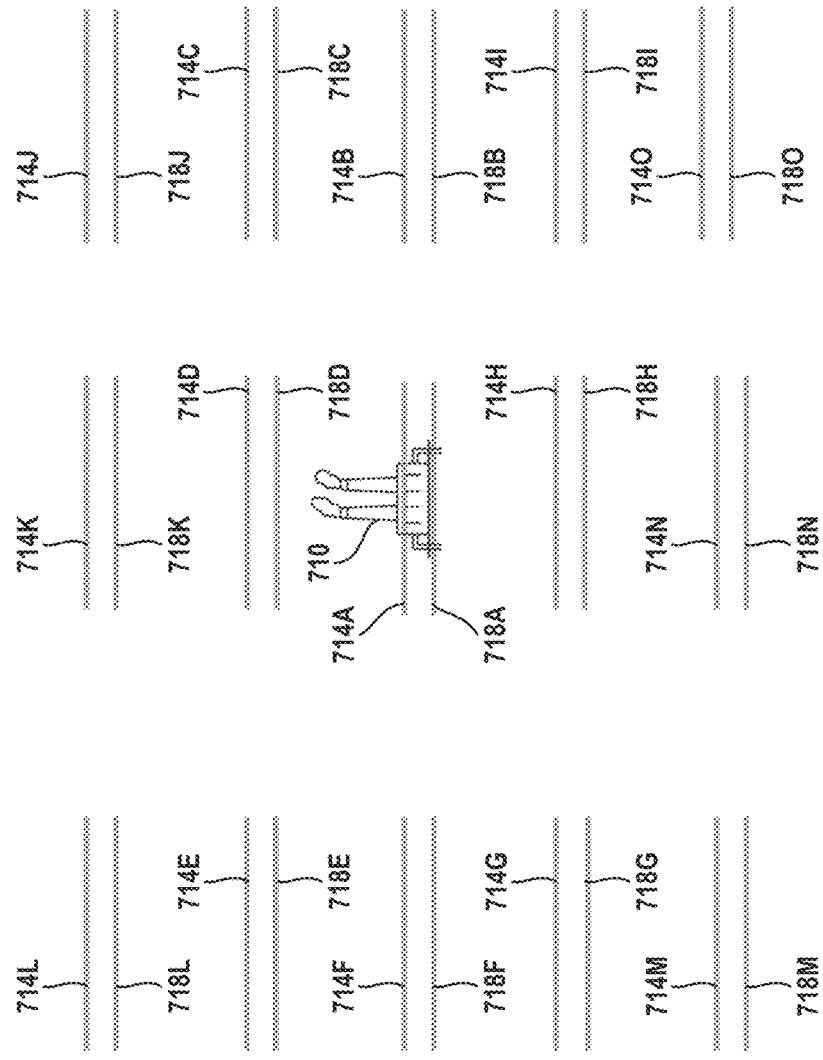
FIG. 7 is a schematic diagram of an example natural geothermal system having multiple pairs of extraction and injection wells formed according to a wine-rack pattern, according to some embodiments.

FIG. 7 is a schematic diagram of an overhead view of an example implementation of an example geothermal system 700 having multiple underground lateral well pairs disposed below a single power plant, according to some embodiments. In some aspects, the example geothermal system 700, or any portion thereof, can be implemented using any of the structures, components, features, or techniques described with reference to the example natural geothermal system 100 described with reference to FIG. 1; the example NAT-EGS 200 described with reference to FIG. 2; the example NAT-EGS 300 described with reference to FIG. 3; the example NAT-EGS 400 described with reference to FIG. 4; the example graph 500 described with reference to FIG. 5; the example geothermal system 600 described with reference to FIG. 6; the example geothermal system 800 described with reference to FIGS. 8A and 8B; the example geothermal system 900 described with reference to FIG. 9; the chart 1000 described with reference to FIG. 10; the method 1100 described with reference to FIG. 11; the method 1200 described with reference to FIG. 12; the example computing system 1300 described with reference to FIG. 13; any other suitable structure, component, feature, or technique, any portion thereof; or any combination thereof. In some embodiments, one or more of the operations described below with reference to FIG. 7 may be performed or otherwise carried out by one or more components of the computer system 1300.

As shown in FIG. 7, the example geothermal system 700 can include a power plant 710 that includes a power generation unit, a pump system, and a well system disposed within an HSA (e.g., a thin-bed HSA). In some embodiments, the HSA can be disposed above an impermeable rock.

The well system can include multiple extraction wells, such as extraction wells 718A-718O, that enable the pump system to provide heated water at one or more extraction depths of the HSA to the power generation unit. Each of the extraction wells 718A-718O can include a production element that includes an extraction pump, an extraction lateral disposed within the HSA at a respective one of the one or more extraction depths, and a vertical extraction component connecting the respective extraction lateral to the power generation unit.

The well system can further include multiple injection wells, such as injection wells 714A-714O, that enable the pump system to inject cooled water from the power generation unit into the HSA at one or more injection depths. Each of the injection wells 714A-714O can include an injection element that includes an injection pump, an injection lateral disposed within the HSA at a respective one of the one or more injection depths, and a vertical injection component connecting the respective injection lateral to the power generation unit. The extraction wells and the injection wells form two or more well pairs.

As shown in FIG. 7, the extraction wells 718A-718O and the injection wells 714A-714O may be formed according to a wine-rack pattern. For example, a first pair of wells can include the extraction well 718A and the injection well 714A whose laterals are disposed within a first region of the HSA. A second pair of wells can include the extraction well 718B and the injection well 714B whose laterals are disposed within a second region of the HSA. A third pair of wells can include the extraction well 718C and the injection well 714C whose laterals are disposed within a third region of the HSA. A fourth pair of wells can include the extraction well 718D and the injection well 714D whose laterals are disposed within a fourth region of the HSA. A fifth pair of wells can include the extraction well 718E and the injection well 714E whose laterals are disposed within a fifth region of the HSA. A sixth pair of wells can include the extraction well 718F and the injection well 714F whose laterals are disposed within a sixth region of the HSA. A seventh pair of wells can include the extraction well 718G and the injection well 714G whose laterals are disposed within a seventh region of the HSA. An eighth pair of wells can include the extraction well 718H and the injection well 714H whose laterals are disposed within an eighth region of the HSA. A ninth pair of wells can include the extraction well 718I and the injection well 714I whose laterals are disposed within a ninth region of the HSA. A tenth pair of wells can include the extraction well 718J and the injection well 714J whose laterals are disposed within a tenth region of the HSA. An eleventh pair of wells can include the extraction well 718K and the injection well 714K whose laterals are disposed within an eleventh region of the HSA. A twelfth pair of wells can include the extraction well 718L and the injection well 714L whose laterals are disposed within a twelfth region of the HSA. A thirteenth pair of wells can include the extraction well 718M and the injection well 714M whose laterals are disposed within a thirteenth region of the HSA. A fourteenth pair of wells can include the extraction well 718N and the injection well 714N whose laterals are disposed within a tenth fourteenth of the HSA. A fifteenth pair of wells can include the extraction well 718O and the injection well 714O whose laterals are disposed within a fifteenth region of the HSA.

The well system can further include a regulatory device configured to generate a set of first control signals configured to instruct the pump system to pump the heated water from the extraction wells 718A-718O to the power generation unit. In some embodiments, the set of first control signals can be further configured to instruct the pump system to pump, via the extraction wells 718A-718O, the heated water from the one or more extraction depths of the HSA at an extraction rate that stimulates a flow field that provides a recharge of the extracted heat. The regulatory device can be further configured to generate a second control signal configured to instruct the power generation unit to extract thermal energy from the heated water and to transform the heated water into cooled water. The regulatory device can be further configured to generate a set of third control signals configured to instruct the pump system to pump the cooled water from the power generation unit to the injection wells 714A-714O.

In some embodiments, the set of third control signals can be further configured to instruct the pump system to inject, via the injection wells 714A-714O, the cooled water with a supplemental agent to enhance a permeability, a porosity, or both of the HSA. In such embodiments, the permeability may not satisfy a threshold permeability range before an injection of the cooled water with the supplemental agent, and the permeability can satisfy the threshold permeability range after the injection of the cooled water with the supplemental agent. In some embodiments, the supplemental agent can include an energetic or propellant-based agent, including, but not limited to, an ignitable solid or liquid fuel and/or any other materials and methods to enhance the permeability of the HSA. In other embodiments, the supplemental agent can include materials including, but not limited to, a muriatic acid, a hydrochloric acid, and/or any other materials and methods to enhance the permeability of the HSA.

In some embodiments, the example geothermal system 700 can provide a large-scale recharge of the HSA via circulatory movement of water and heat through the HSA that is induced by the pressure field and temperature gradient associated with pumping water from the extraction wells 718A-718O and back into the HSA via the injection wells 714A-714O. For example, water from areas that are not within regions surrounding each pair of wells can be pulled into the heat zone between the pair of wells via the circulatory movement. Thus, water in regions of the HSA around the well pairs can be continuously and naturally reheated by the higher temperature of sedimentary rocks throughout the HSA.

In some embodiments, the power plant 710 can generate a power output equal of about 25 to 500 megawatts. For example, the power generation unit of the power plant 710 may generate a power output of about 20 megawatts using only the extraction well 718A and the injection well 714A. In contrast, the power generation unit of the power plant 710 may generate a power output of about 25 to 500 megawatts using the extraction wells 718A-718O and the injection wells 714A-714O as described herein.

Figure 8A:
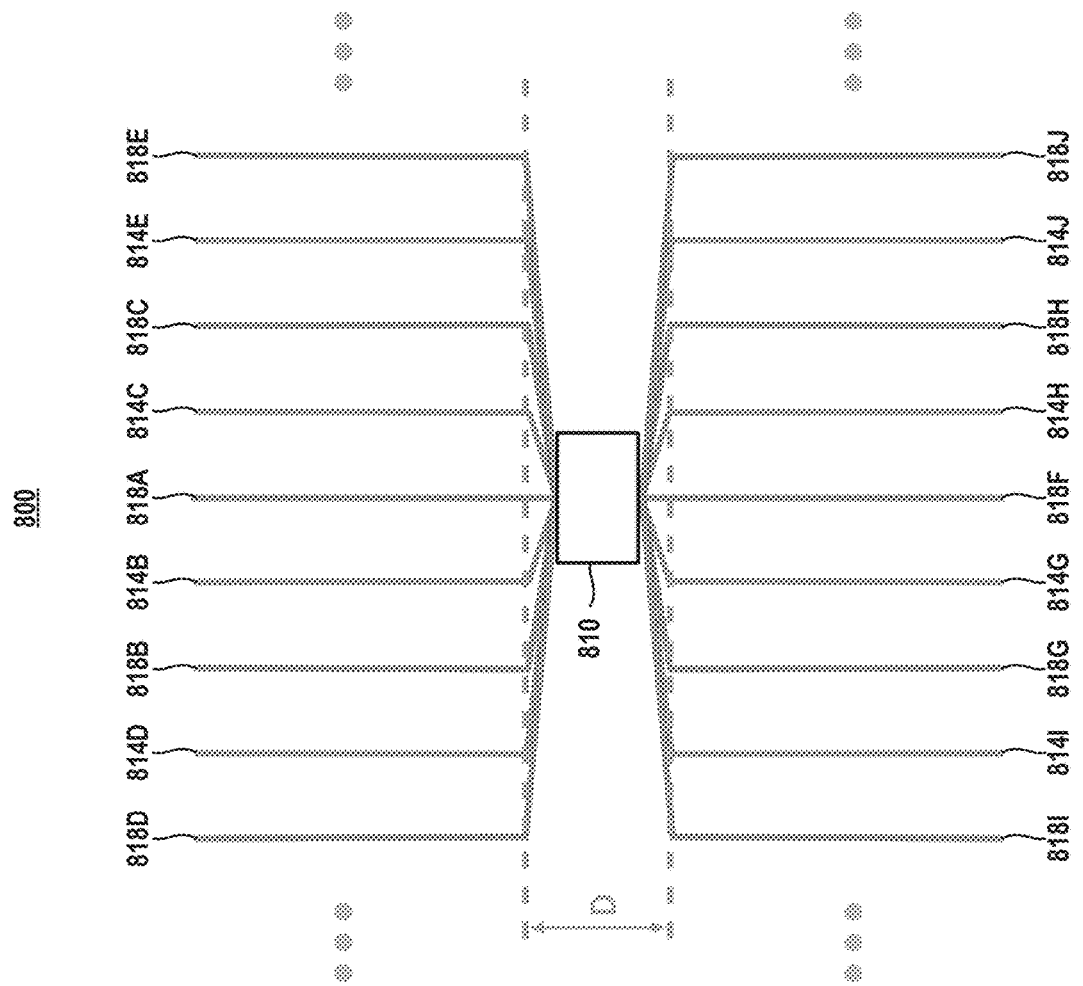
FIGS. 8A and 8B are schematic diagrams of an example natural geothermal system having multiple pairs of extraction and injection wells formed according to a gun-barrel pattern, according to some embodiments.
Figure 8B:
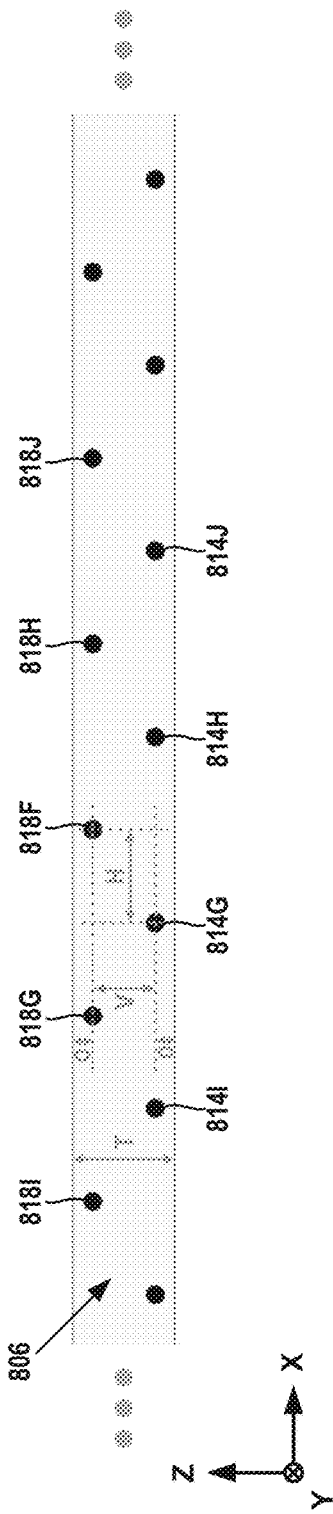

FIGS. 8A and 8B are schematic diagrams of an overhead view (FIG. 8A) and a side view (FIG. 8B) of an example implementation of an example geothermal system 800 having multiple underground lateral well pairs disposed below a single power plant, according to some embodiments. In some aspects, the example geothermal system 800, or any portion thereof, can be implemented using any of the structures, components, features, or techniques described with reference to the example natural geothermal system 100 described with reference to FIG. 1; the example NAT-EGS 200 described with reference to FIG. 2; the example NAT-EGS 300 described with reference to FIG. 3; the example NAT-EGS 400 described with reference to FIG. 4; the example graph 500 described with reference to FIG. 5; the example geothermal system 600 described with reference to FIG. 6; the example geothermal system 700 described with reference to FIG. 7; the example geothermal system 900 described with reference to FIG. 9; the chart 1000 described with reference to FIG. 10; the method 1100 described with reference to FIG. 11; the method 1200 described with reference to FIG. 12; the example computing system 1300 described with reference to FIG. 13; any other suitable structure, component, feature, or technique; any portion thereof: or any combination thereof. In some embodiments, one or more of the operations described below with reference to FIGS. 8A and 8B may be performed or otherwise carried out by one or more components of the computer system 1300.

As shown in FIG. 8A, the example geothermal system 800 can include a power plant 810 that includes a power generation unit, a pump system, and a well system disposed within an HSA (e.g., a thin-bed HSA). In some embodiments, the HSA can be disposed above an impermeable rock.

The well system can include multiple extraction wells, such as extraction wells 818A-818J, that enable the pump system to provide heated water at one or more extraction depths of the HSA to the power generation unit. Each of the extraction wells 818A-818J can include a production element that includes an extraction pump, an extraction lateral disposed within the HSA at a respective one of the one or more extraction depths, and a vertical extraction component connecting the respective extraction lateral to the power generation unit.

The well system can further include multiple injection wells, such as injection wells 814A-814J, that enable the pump system to inject cooled water from the power generation unit into the HSA at one or more injection depths. Each of the injection wells 814A-814J can include an injection element that includes an injection pump, an injection lateral disposed within the HSA at a respective one of the one or more injection depths, and a vertical injection component connecting the respective injection lateral to the power generation unit. The extraction wells and the injection wells form two or more well pairs.

As shown in FIG. 8A, the extraction wells 818A-818J and the injection wells 814A-814J may be formed according to a gun-barrel pattern. For example, a first set of injection and extraction wells can be disposed pointing away from the power plant 810 in a first direction (e.g., substantially parallel to the positive Y-axis), and a second set of injection and extraction wells can be disposed pointing away from the power plant 810 in a second direction (e.g., substantially parallel to the negative Y-axis) different from the first direction. The distance D represents the distance between the heels of the first set of injection and extraction wells and the second set of injection and extraction wells. The first set of injection and extraction wells can include, for example, the extraction well 818A, the extraction well 818B, the extraction well 818C, the extraction well 818D, the extraction well 818E, the injection well 814B, the injection well 814C, the injection well 814D, and the injection well 814E, each of whose laterals are disposed within a first region of the HSA. The second set of injection and extraction wells can include, for example, the extraction well 818F, the extraction well 818G, the extraction well 818H, the extraction well 818I, the extraction well 818J, the injection well 814G, the injection well 814H, the injection well 814I, and the injection well 814J, each of whose laterals are disposed within a second region of the HSA. In some embodiments, the first set of injection and extraction wells and the second set of injection and extraction wells can include as many wells as possible pointing in both directions from the power plant. In some embodiments, the diagonal lines connecting the wells to the power plant 810 can come substantially straight up to the surface and feed into insulated pipes that run to the power plant 810 to avoid cooling the produced water in a long well path to the surface.

The well system can further include a regulatory device configured to generate a set of first control signals configured to instruct the pump system to pump the heated water from the extraction wells 818A-818J to the power generation unit. In some embodiments, the set of first control signals can be further configured to instruct the pump system to pump, via the extraction wells 818A-818J, the heated water from the one or more extraction depths of the HSA at an extraction rate that stimulates a flow field that provides a recharge of the extracted heat. The regulatory device can be further configured to generate a second control signal configured to instruct the power generation unit to extract thermal energy from the heated water and to transform the heated water into cooled water. The regulatory device can be further configured to generate a set of third control signals configured to instruct the pump system to pump the cooled water from the power generation unit to the injection wells 814A-814J.

In some embodiments, the set of third control signals can be further configured to instruct the pump system to inject, via the injection wells 814A-814J, the cooled water with a supplemental agent to enhance a permeability, a porosity, or both of the HSA. In such embodiments, the permeability may not satisfy a threshold permeability range before an injection of the cooled water with the supplemental agent, and the permeability can satisfy the threshold permeability range after the injection of the cooled water with the supplemental agent. In some embodiments, the supplemental agent can include an energetic or propellant-based agent, including, but not limited to, an ignitable solid or liquid fuel and/or any other materials and methods to enhance the permeability of the HSA. In other embodiments, the supplemental agent can include materials including, but not limited to, a muriatic acid, a hydrochloric acid, and/or any other materials and methods to enhance the permeability of the HSA.

In some embodiments, the example geothermal system 800 can provide a large-scale recharge of the HSA via circulatory movement of water and heat through the HSA that is induced by the pressure field and temperature gradient associated with pumping water from the extraction wells 818A-818J and back into the HSA via the injection wells 814A-814J. For example, water from areas that are not within regions surrounding each pair of wells can be pulled into the heat zone between the pair of wells via the circulatory movement. Thus, water in regions of the HSA around the well pairs can be continuously and naturally reheated by the higher temperature of sedimentary rocks throughout the HSA.

In some embodiments, the power plant 810 can generate a power output of about 25 to 500 megawatts. For example, the power generation unit of the power plant 810 may generate a power output of about 20 megawatts using only the extraction well 818B and the injection well 814B. In contrast, the power generation unit of the power plant 810 may generate a power output of about 25 to 500 megawatts using the extraction wells 818A-818J and the injection wells 814A-814J as described herein.

FIG. 8B shows a side view 801 of the second set of injection and extraction wells disposed within the HSA 806. As shown in FIG. 8B, the laterals of each of the extraction well 818F, the extraction well 818G, the extraction well 818H, the extraction well 818I, and the extraction well 818J can be disposed within a shallower portion of the HSA 806. The injection well 814G, the injection well 814H, the injection well 814I, and the injection well 814J can be disposed within a deeper portion of the HSA 806.

In one illustrative and non-limiting example embodiment, the well length for each of the extraction and injection wells may be about 1,500 meters. The thickness T of the HSA 806 may be about 40 meters (e.g., the thickness of the Lyons formation shown in FIG. 10). The offset O of the row of extraction wells 818F-818J from the top of the HSA 806 may be about 3 meters. The offset O of the row of injection wells 814G-814J from the bottom of the HSA 806 also may be about 3 meters. The depth difference V (e.g., the vertical spacing) between the row of extraction wells 818F-818J and the row of injection wells 814G-814J may be about 34 meters (e.g., $V=T-2*O$). Accordingly, the depth difference V between a shallowest one of the extraction depths of the extraction wells 818F-818J and a deepest one of the injection depths of the injection wells 814G-814J may be equal to or less than about the thickness of the HSA 806. The spacing H between the laterals of the extraction and injection wells may be between about 650 meters and about 800 meters. In some aspects, an 800-meter spacing between the laterals of the extraction and injection wells may substantially increase well life but could cause geomechanical problems depending on the rock properties of the HSA 806 and surrounding layers.

Figure 9:
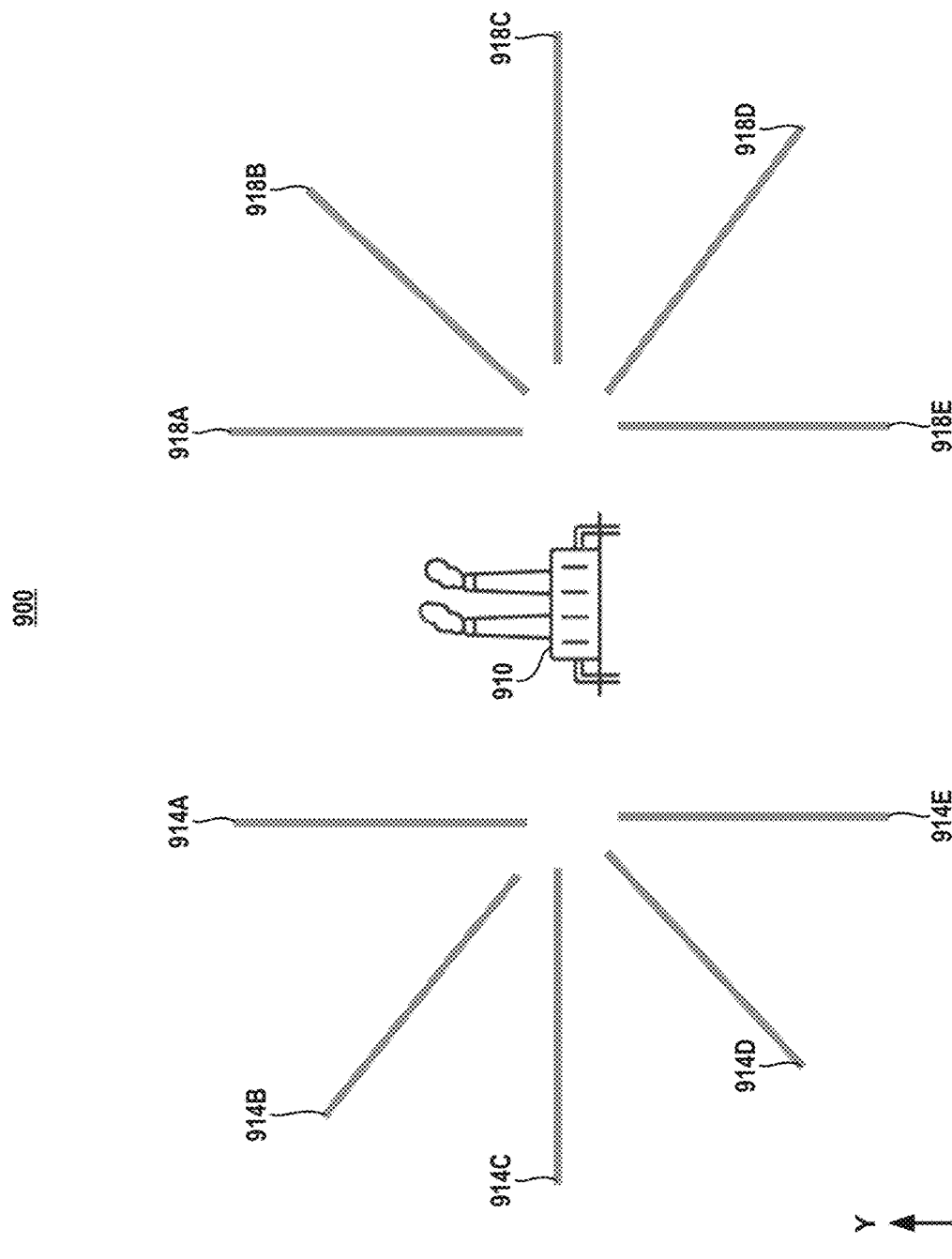
FIG. 9 is a schematic diagram of an example natural geothermal system having multiple pairs of extraction and injection wells formed according to a chicken-foot pattern, according to some embodiments.

FIG. 9 is a schematic diagram of an overhead view of an example implementation of an example geothermal system 900 having multiple underground lateral well pairs disposed below a single power plant, according to some embodiments. In some aspects, the example geothermal system 900, or any portion thereof, can be implemented using any of the structures, components, features, or techniques described with reference to the example natural geothermal system 100 described with reference to FIG. 1; the example NAT-EGS 200 described with reference to FIG. 2; the example NAT-EGS 300 described with reference to FIG. 3; the example NAT-EGS 400 described with reference to FIG. 4; the example graph 500 described with reference to FIG. 5; the example geothermal system 600 described with reference to FIG. 6; the example geothermal system 700 described with reference to FIG. 7; the example geothermal system 800 described with reference to FIGS. 8A and 8B; the chart 1000 described with reference to FIG. 10; the method 1100 described with reference to FIG. 11; the method 1200 described with reference to FIG. 12; the example computing system 1300 described with reference to FIG. 13; any other suitable structure, component, feature, or technique; any portion thereof; or any combination thereof. In some embodiments, one or more of the operations described below with reference to FIG. 9 may be performed or otherwise carried out by one or more components of the computer system 1300.

As shown in FIG. 9, the example geothermal system 900 can include a power plant 910 that includes a power generation unit, a pump system, and a well system disposed within an HSA (e.g., a thin-bed HSA). In some embodiments, the HSA can be disposed above an impermeable rock.

The well system can include multiple extraction wells, such as extraction wells 918A-918E, that enable the pump system to provide heated water at one or more extraction depths of the HSA to the power generation unit. Each of the extraction wells 918A-918E can include a production element that includes an extraction pump, an extraction lateral disposed within the HSA at a respective one of the one or more extraction depths, and a vertical extraction component connecting the respective extraction lateral to the power generation unit.

The well system can further include multiple injection wells, such as injection wells 914A-914E, that enable the pump system to inject cooled water from the power generation unit into the HSA at one or more injection depths. Each of the injection wells 914A-914E can include an injection element that includes an injection pump, an injection lateral disposed within the HSA at a respective one of the one or more injection depths, and a vertical injection component connecting the respective injection lateral to the power generation unit. The extraction wells and the injection wells form two or more well pairs.

As shown in FIG. 9, the extraction wells 918A-918E and the injection wells 914A-914E may be formed according to a chicken-foot pattern. For example, the injection wells 914A-914E can be disposed pointing away from the power plant 910 radially in a first region of the HSA, and the extraction wells 918A-918E can be disposed pointing away from the power plant 910 radially in a second region of the HSA. The injection wells 914A-914E can include, for example, the injection well 914A, the injection well 914B, the injection well 914C, the injection well 914D, and the injection well 914E, each of whose laterals are disposed radially within the first region of the HSA. The extraction wells 918A-918E can include, for example, the extraction well 918A, the extraction well 918B, the extraction well 918C, the extraction well 918D, the extraction well 918E, each of whose laterals are disposed radially within the second region of the HSA.

The well system can further include a regulatory device configured to generate a set of first control signals configured to instruct the pump system to pump the heated water from the extraction wells 918A-918E to the power generation unit. In some embodiments, the set of first control signals can be further configured to instruct the pump system to pump, via the extraction wells 918A-918E, the heated water from the one or more extraction depths of the HSA at an extraction rate that stimulates a flow field that provides a recharge of the extracted heat. The regulatory device can be further configured to generate a second control signal configured to instruct the power generation unit to extract thermal energy from the heated water and to transform the heated water into cooled water. The regulatory device can be further configured to generate a set of third control signals configured to instruct the pump system to pump the cooled water from the power generation unit to the injection wells 914A-914E.

In some embodiments, the set of third control signals can be further configured to instruct the pump system to inject, via the injection wells 914A-914E, the cooled water with a supplemental agent to enhance a permeability, a porosity, or both of the HSA. In such embodiments, the permeability may not satisfy a threshold permeability range before an injection of the cooled water with the supplemental agent, and the permeability can satisfy the threshold permeability range after the injection of the cooled water with the supplemental agent. In some embodiments, the supplemental agent can include an energetic or propellant-based agent, including, but not limited to, an ignitable solid or liquid fuel and/or any other materials and methods to enhance the permeability of the HSA. In other embodiments, the supplemental agent can include materials including, but not limited to, a muriatic acid, a hydrochloric acid, and/or any other materials and methods to enhance the permeability of the HSA.

In some embodiments, the example geothermal system 900 can provide a large-scale recharge of the HSA via circulatory movement of water and heat through the HSA that is induced by the pressure field and temperature gradient associated with pumping water from the extraction wells 918A-918E and back into the HSA via the injection wells 914A-914E. For example, water from areas that are not within regions surrounding each pair of wells can be pulled into the heat zone between the pair of wells via the circulatory movement. Thus, water in regions of the HSA around the well pairs can be continuously and naturally reheated by the higher temperature of sedimentary rocks throughout the HSA.

In some embodiments, the power plant 910 can generate a power output of about 25 to 500 megawatts. For example, the power generation unit of the power plant 910 may generate a power output of about 20 megawatts using only the extraction well 918A and the injection well 914A. In contrast, the power generation unit of the power plant 910 may generate a power output of about 25 to 500 megawatts using the extraction wells 918A-918E and the injection wells 914A-914E as described herein.

Figure 10:
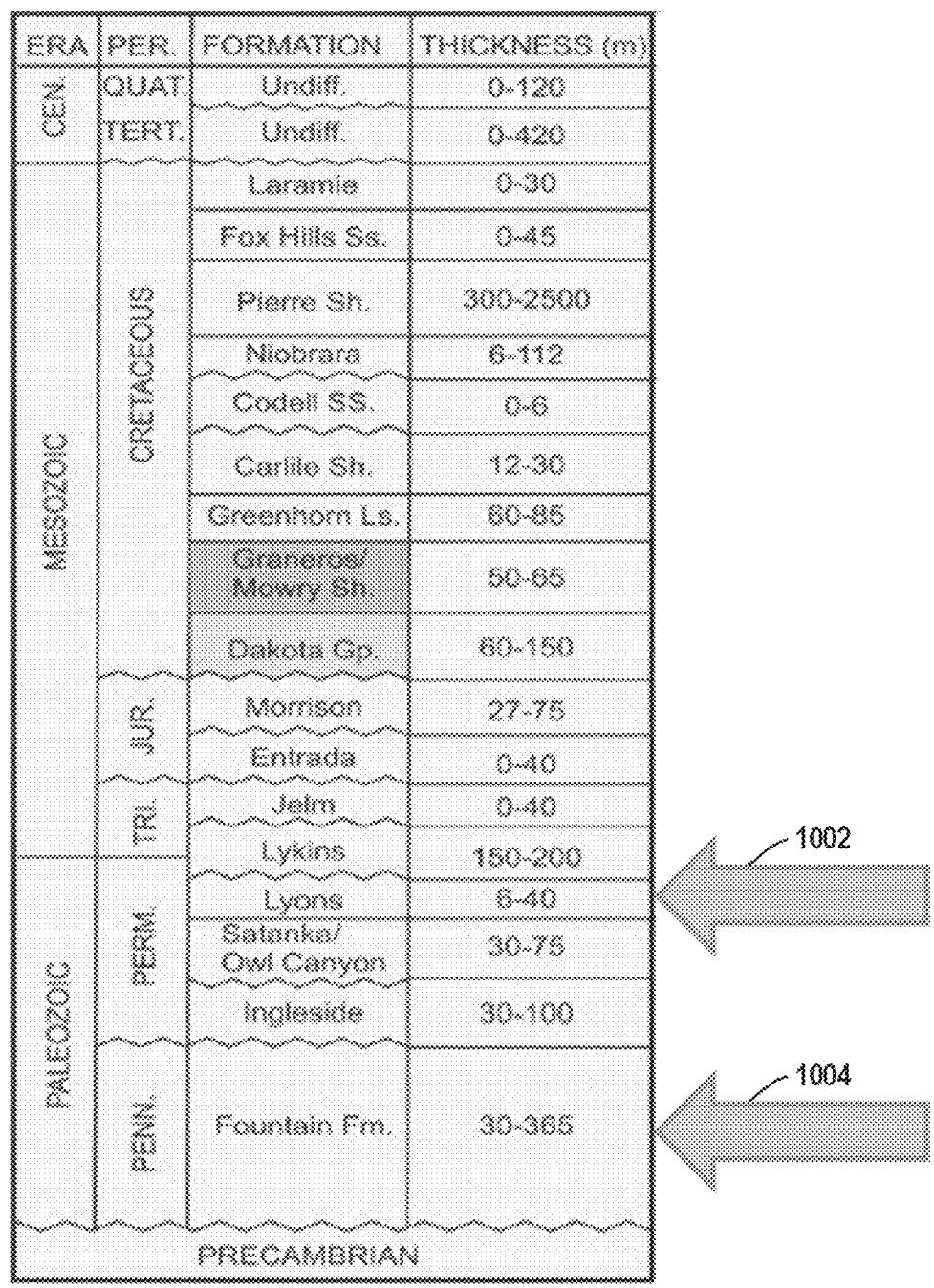
FIG. 10 shows a chart of the thicknesses and relative depths of various sedimentary layers, according to some embodiments.

FIG. 10 shows a chart 1000 of the thicknesses and relative depths of various sedimentary layers, according to an embodiment. In some embodiments, the extraction and injection laterals disclosed herein (e.g., as described with reference to FIGS. 1, 2, 3, 4, 5, 6, 7, 8A, 8B, 9, 11, and 12)

can be stacked vertically each in a different formation, such as the Lyons formation indicated by reference arrow 1002 and the Fountain formation indicated by the reference arrow 1004.

In some embodiments, any of the geothermal systems disclosed herein may be configured according to a vertically-stacked pattern, such as a two-formation stack having one set of extraction and injection laterals disposed in a first formation (e.g., Lyons) and another set of extraction and injection laterals disposed in a second formation (e.g., Fountain). For example, the example geothermal system 600 may include the extraction wells 618A-618I and the injection wells 614A-614I disposed in the Lyons formation and an additional set of extraction and injection wells disposed in the Fountain formation, all connected to the power plant 610. In another example, the example geothermal system 700 may include the extraction wells 718A-718O and the injection wells 714A-714O disposed in the Lyons formation and an additional set of extraction and injection wells disposed in the Fountain formation, all connected to the power plant 710. In yet another example, the example geothermal system 800 may include the extraction wells 818A-818J and the injection wells 814A-814J disposed in the Lyons formation and an additional set of extraction and injection wells disposed in the Fountain formation, all connected to the power plant 810. In still another example, the example geothermal system 900 may include the extraction wells 918A-918E and the injection wells 914A-914E disposed in the Lyons formation and an additional set of extraction and injection wells disposed in the Fountain formation, all connected to the power plant 910.

Example Method for Configuring a Geothermal System

FIG. 11 is a flowchart for a method 1100 for configuring a geothermal system, according to an embodiment. Method 1100 can be performed by processing logic that can include hardware (e.g., circuitry, dedicated logic, programmable logic, microcode, etc.), software (e.g., instructions executing on a computing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art.

Method 1100 shall be described with reference to FIGS. 2 and 6. However, method 1100 is not limited to those example embodiments.

In 1102, the method 1100 includes determining, according to a geothermal characteristic of an HSA 206 below a surface 202 location that satisfies a threshold associated with providing geothermal energy, one or more respective extraction depths $D_E$ for extraction wells 618A-618I (e.g., each of the extraction wells 618A-618I may be formed at about the same, or at a different, extraction depth $D_E$) disposed to extract heated water from the HSA 206. In 1102, the method 1100 further includes determining, according to the geothermal characteristic, one or more respective injection depths $D_I$ for injection wells 614A-614I (e.g., each of the injection wells 614A-614I may be formed at about the same, or at a different, injection depth $D_I$) disposed to inject cooled water into the HSA 206 that is generated from a heat extraction process (e.g., performed by the power plant 610) associated with capturing geothermal energy. The extraction wells and the injection wells form two or more well pairs. In some embodiments, an average, mean, or median depth difference $\Delta D$ between the one or more injection depths $D_I$ and the one or more extraction depths $D_E$ can be based on the geothermal characteristic. In some embodiments, an average, mean, or median depth difference $\Delta D$ between the one or more injection depths $D_I$ and the one or more extraction depths $D_E$ can be equal to or less than about the thickness $T_{HSA}$ of the HSA 206. For example, the depth difference $\Delta D$ between a shallowest one of the one or more injection depths $D_I$ and a deepest one of the one or more extraction depths $D_E$ can be equal to or less than about the thickness $T_{HSA}$ of the HSA 206. In some embodiments, a thickness of the HSA 206 can be equal to or less than about 500 meters.

In some embodiments, the extraction well 618A can include the extraction lateral 218, and the injection well 614A can include the injection lateral 214. In some embodiments, the horizontal distance 223 between the extraction lateral 218 and the injection lateral 214 can be equal to or greater than about 300 meters.

In 1104, the method 1100 includes configuring the NAT-EGS 200 to extract the heated water from the HSA 206 at the one or more extraction depths $D_E$. Optionally, the method 1100 can further include configuring the NAT-EGS 200 to pump, via the extraction wells 618A-618I, the heated water from the one or more extraction depths $D_E$ at an extraction rate that stimulates a flow field that provides a recharge of the extracted heat.

In 1106, the method 1100 includes configuring the NAT-EGS 200 to inject cooled water into the HSA 206 at the one or more injection depths $D_I$. In some embodiments, the configuring the NAT-EGS 200 to inject the cooled water can include configuring the NAT-EGS 200 to inject, via the injection wells 614A-614I, the cooled water with a supplemental agent to enhance a permeability of the HSA 206. In such embodiments, before an injection of the cooled water with the supplemental agent, the permeability does not satisfy a threshold permeability range; and after the injection of the cooled water with the supplemental agent, the permeability satisfies the threshold permeability range. In one example, the supplemental agent can include an energetic or propellant-based agent, including, but not limited to, an ignitable solid or liquid fuel and/or any other materials and methods to enhance the permeability of the HSA 206. In another example, the supplemental agent can include, for example, such materials as or similar to a muriatic acid or hydrochloric acid.

Optionally, the method 1100 can further include configuring the geothermal system to have a power output of about 25 to 500 megawatts. In one non-limiting example, the geothermal system (e.g., power plant 610) may be configured to have a power output of about 20 megawatts using only the extraction well 618A and the injection well 614A. In contrast, the geothermal system may be configured to have a power output of about 25 to 500 megawatts using the extraction wells 618A-618I and the injection wells 614A-614I.

Optionally, the method 1100 can further include determining a formation for the extraction wells 618A-618I and the injection wells 614A-614I. The formation can include, but is not limited to, a wagon-wheel pattern (e.g., as described with reference to FIG. 6), a wine-rack pattern (e.g., as described with reference to FIG. 7), a gun-barrel pattern (e.g., as described with reference to FIGS. 8A and 8B), a chicken-foot pattern (e.g., as described with reference to FIG. 9), a vertically-stacked pattern (e.g., as described with reference to FIG. 10), any other suitable pattern or arrangement, or any combination thereof.

Optionally, the method 1100 can further include determining a flow characteristic of the HSA 206. Optionally, the method 1100 can further include determining, based on the one or more extraction depths $D_E$, the one or more injection depths $D_I$, and the flow characteristic, a water flow rate associated with extracting the heated water via the extraction wells 618A-618I or injecting the cooled water via the injection wells 614A-614I. Optionally, the method 1100 can further include configuring the NAT-EGS 200 to extract the heated water or inject the cooled water at the water flow rate.

Example Method for Harvesting Heat from a Hot Sedimentary Aquifer

Figure 12:
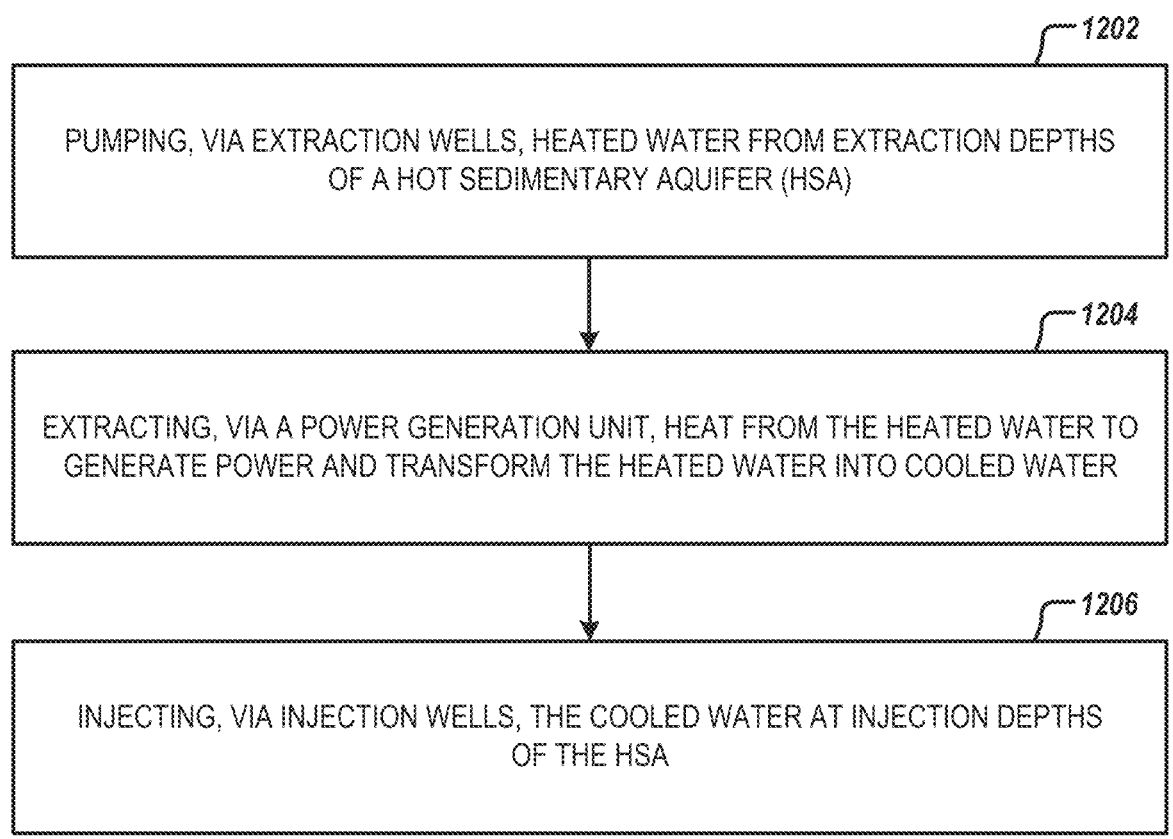
FIG. 12 is a flowchart illustrating a process for harvesting heat from a hot sedimentary aquifer (HSA), according to some embodiments.

FIG. 12 is a flowchart for a method 1200 for harvesting heat from an HSA, according to an embodiment. Method 1200 can be performed by processing logic that can include hardware (e.g., circuitry, dedicated logic, programmable logic, microcode, etc.), software (e.g., instructions executing on a computing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art.

Method 1200 shall be described with reference to FIGS. 2 and 6. However, method 1200 is not limited to those example embodiments.

In 1202, the method 1200 includes pumping, via extraction wells 618A-618I, heated water from one or more extraction depths $D_E$ of an HSA 206. Each of the extraction wells 618A-618I may be formed at about the same, or at a different, extraction depth $D_E$. The HSA 206 can be identified based on a permeability (e.g., bulk permeability) satisfying a threshold permeability range. In some embodiments, the permeability can be a bulk permeability determined according to an analysis of geologic data associated with the HSA 206 which ultimately will allow for sufficient pumping of the heated water to generate geothermal power.

In some embodiments, for each respective one of the extraction wells 618A-618I, the pumping the heated water can include pumping, via the extraction wells 618A-618I, the heated water via a respective production element and a respective extraction lateral 218 of the respective one of the extraction wells 618A-618I. The respective production element can include a respective extraction pump and a respective vertical extraction component 219 extending between a respective one of the one or more extraction depths $D_E$ and a power generation unit of a power plant 610. The respective extraction lateral 218 can be mechanically coupled to the respective production element and include one or more respective lateral production branches that extend from the respective production element at the respective one of the one or more extraction depths $D_E$.

In 1204, the method 1200 includes extracting, via a power generation unit of a power plant 610, heat from the heated water to generate power and transform the heated water into cooled water.

In 1206, the method 1200 includes injecting, via injection wells 614A-614I, the cooled water at one or more injection depths DA of the HSA 206. Each of the injection wells 614A-614I may be formed at about the same, or at a different, injection depth Dr. The extraction wells and the injection wells form two or more well pairs.

In some embodiments, the extraction well 618A can include the extraction lateral 218, and the injection well 614A can include the injection lateral 214. In some embodiments, the horizontal distance 223 between the extraction lateral 218 and the injection lateral 214 can be equal to or greater than about 300 meters.

In some embodiments, the pumping the heated water can include pumping, via the extraction wells 618A-618I, the heated water from the one or more extraction depths $D_E$ of the HSA 206 at an extraction rate that stimulates a flow field that provides a recharge of the extracted heat (e.g., to provide a decades-long longevity of the extracted heat for geothermal power generation).

In some embodiments, an average, mean, or median depth difference ΔD between the one or more injection depths $D_I$ and the one or more extraction depths $D_E$ can be equal to or less than about the thickness $T_{HSA}$ of the HSA 206. For example, the depth difference ΔD between a shallowest one of the one or more injection depths $D_I$ and a deepest one of the one or more extraction depths $D_E$ can be equal to or less than about the thickness $T_{HSA}$ of the HSA 206. In some embodiments, a thickness of the HSA 206 can be equal to or less than about 500 meters.

In some embodiments, for each respective one of the injection wells 614A-614I, the injecting of the cooled water can include injecting the cooled water via a respective injection element and a respective injection lateral 214 of the respective one of the injection wells 614A-614I. The respective injection element can include a respective injection pump and a respective vertical injection component 213 extending between a respective one of the injection depths $D_I$ and the power generation unit. The respective injection lateral 214 can be mechanically coupled to the respective injection element and can include one or more respective lateral injection branches that extend from the respective injection element at a respective one of the injection depths $D_I$.

In some embodiments, the injecting of the cooled water can include injecting, via the injection wells 614A-614I, the cooled water with a supplemental agent to enhance the permeability of the HSA 206. The supplemental agent can include, for example, such materials as or similar to an energetic or propellant-based agent (e.g., solid or liquid fuel), a muriatic acid, or a hydrochloric acid. In such embodiments, before the injecting the cooled water with the supplemental agent, the permeability does not satisfy the threshold permeability range; and after the injecting the cooled water with the supplemental agent, the permeability satisfies the threshold permeability range.

Optionally, the method 1200 can further include generating, via the power generation unit of the power plant 610, a power output of about 25 to 500 megawatts. In one non-limiting example, the power generation unit of the power plant 610 may be configured to generate about 20 megawatts using only the extraction well 618A and the injection well 614A. In contrast, the power generation unit of the power plant 610 may be configured to generate about 25 to 500 megawatts or more using the extraction wells 618A-618I and the injection wells 614A-614I.

In some embodiments, the extraction wells 618A-618I and the injection wells 614A-614I may be formed according to a wagon-wheel pattern (e.g., as described with reference to FIG. 6), a wine-rack pattern (e.g., as described with reference to FIG. 7), a gun-barrel pattern (e.g., as described with reference to FIGS. 8A and 8B), a chicken-foot pattern (e.g., as described with reference to FIG. 9), a vertically-stacked pattern (e.g., as described with reference to FIG. 10), any other suitable pattern or arrangement, or any combination thereof.

Example Computer System

Figure 13:
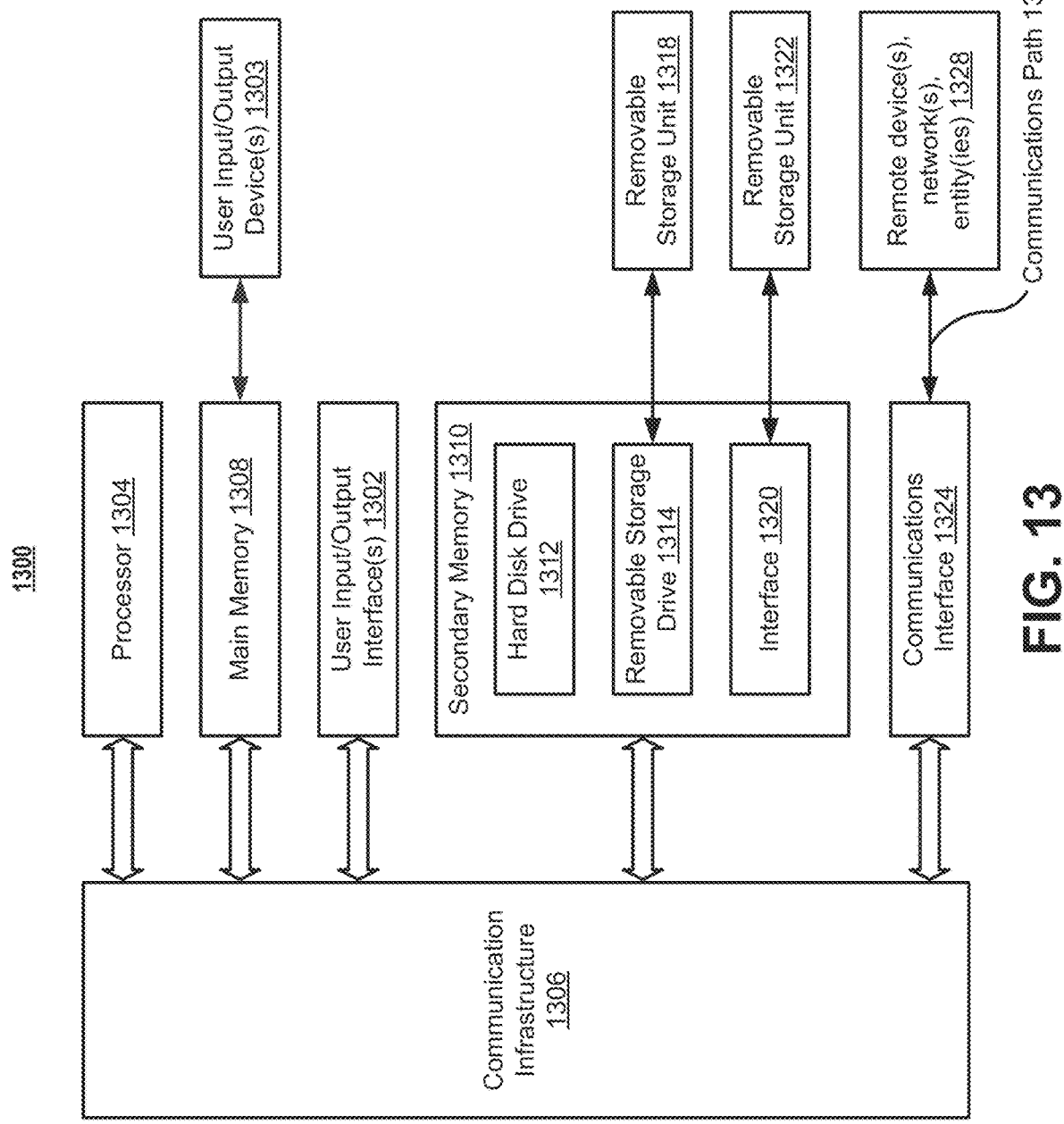
FIG. 13 illustrates an example computer system for implementing various embodiments.

Various embodiments of this disclosure may be implemented, for example, using one or more computer systems, such as computer system 1300 shown in FIG. 13. For example, the systems, devices, components, and/or structures disclosed herein may be implemented using combinations or sub-combinations of computer system 1300. Additionally or alternatively, computer system 1300 can include one or more computer systems that may be used, for example, to implement any of the embodiments discussed herein, as well as combinations and sub-combinations thereof. It is noted, however, that the computer system 1300 is provided solely for illustrative purposes, and is not limiting. Embodiments of this disclosure may be implemented using and/or may be part of environments different from and/or in addition to the computer system 1300, as will be appreciated by persons skilled in the relevant art(s) based on the teachings contained herein. An example of the computer system 1300 shall now be described.

Computer system 1300 may include one or more processors (also called central processing units, or CPUs), such as one or more processors 1304. In some embodiments, one or more processors 1304 may be connected to a communications infrastructure 1306 (e.g., a bus).

Computer system 1300 may also include user input/output device(s) 1303, such as monitors, keyboards, pointing devices, etc., which may communicate with communications infrastructure 1306 through user input/output interface(s) 1302.

One or more of the one or more processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 may also include a main memory 1308 (e.g., a primary memory or storage device), such as random access memory (RAM). Main memory 1308 may include one or more levels of cache. Main memory 1308 may have stored therein control logic (e.g., computer software) and/or data.

Computer system 1300 may also include one or more secondary storage devices or memories such as secondary memory 1310. Secondary memory 1310 may include, for example, a hard disk drive 1312, a removable storage drive 1314 (e.g., a removable storage device), or both. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (e.g., control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1300 may further include a communications interface 1324 (e.g., a network interface). Communications interface 1324 may enable computer system 1300 to communicate and interact with any combination of external devices, external networks, external entities, etc. (individually and collectively referenced by reference number 1328). For example, communications interface 1324 may allow computer system 1300 to communicate with external devices 1328 (e.g., remote devices) over communications path 1326, which may be wired and/or wireless (or a combination thereof), and which may include any combination of LANs, WANs, the Internet, etc. Control logic and/or data may be transmitted to and from computer system 1300 via communications path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with various standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 1300, main memory 1308, secondary memory 1310, removable storage unit 1318, and removable storage unit 1322, as well as tangible articles of manufacture embodying any combination of the foregoing. Such control logic, when executed by one or more data processing devices (e.g., one or more computing devices, such as the computer system 1300 or the one or more processors 1304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all example embodiments as contemplated by the inventors, and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A method comprising:
pumping, via extraction wells, heated water from extraction depths of a hot sedimentary aquifer (HSA);
extracting, via a power generation unit, heat from the heated water to generate power and transform the heated water into cooled water; and
injecting, via injection wells, the cooled water at injection depths of the HSA,
wherein the HSA is identified based on a permeability of the HSA satisfying a threshold permeability range, and
wherein the extraction wells and the injection wells form two or more well pairs.

2. The method of claim 1, wherein the HSA is further identified based on a predicted power output for the generated power that satisfies a threshold power generation requirement.

3. The method of claim 1, wherein the two or more well pairs are formed according to a wagon-wheel pattern.

4. The method of claim 1, wherein the two or more well pairs are formed according to a wine-rack pattern.

5. The method of claim 1, wherein the two or more well pairs are formed according to a gun-barrel pattern.

6. The method of claim 1, wherein the two or more well pairs are formed according to a chicken-foot pattern.

7. The method of claim 1, wherein the two or more well pairs are formed according to a vertically-stacked pattern.

8. The method of claim 1, wherein:
a thickness of the HSA is equal to or less than about 500 meters, and
a depth difference between a shallowest one of the extraction depths and a deepest one of the injection depths is equal to or less than about the thickness of the HSA.

9. The method of claim 1, wherein:
the injecting the cooled water comprises:
injecting, via the injection wells, the cooled water with a supplemental agent to enhance the permeability of the HSA;
before the injecting the cooled water with the supplemental agent, the permeability of the HSA does not satisfy the threshold permeability range; and
after the injecting the cooled water with the supplemental agent, the permeability of the HSA satisfies the threshold permeability range.

10. A method comprising:
determining, according to a geothermal characteristic of a hot sedimentary aquifer (HSA) below a surface location that satisfies a threshold associated with providing geothermal energy, extraction depths for extraction wells disposed to extract heated water from the HSA and injection depths for injection wells disposed to inject cooled water into the HSA that is generated from a heat extraction process associated with capturing geothermal energy, wherein the extraction wells and the injection wells form two or more well pairs;
configuring a geothermal system in association with the surface location to extract, via the extraction wells, the heated water from the HSA at the extraction depths; and
configuring the geothermal system to inject, via the injection wells, cooled water into the HSA at the injection depths.

11. The method of claim 10, wherein the HSA is selected based on a predicted power output for the captured geothermal energy that satisfies a threshold power generation requirement.

12. The method of claim 10, further comprising determining a formation for the two or more well pairs, wherein the formation comprises a wagon-wheel pattern.

13. The method of claim 10, further comprising determining a formation for the two or more well pairs, wherein the formation comprises a wine-rack pattern.

14. The method of claim 10, further comprising determining a formation for the two or more well pairs, wherein the formation comprises a gun-barrel pattern.

15. The method of claim 10, further comprising determining a formation for the two or more well pairs, wherein the formation comprises a chicken-foot pattern.

16. The method of claim 10, further comprising determining a formation for the two or more well pairs, wherein the formation comprises a vertically-stacked pattern.

17. The method of claim 10, wherein:
a thickness of the HSA is equal to or less than about 500 meters, and
a depth difference between a shallowest one of the extraction depths and a deepest one of the injection depths is equal to or less than about the thickness of the HSA.

18. The method of claim 10, wherein:
the configuring the geothermal system to inject the cooled water comprises:
configuring the geothermal system to inject, via the injection wells, the cooled water with a supplemental agent to enhance a permeability of the HSA;
before an injection of the cooled water with the supplemental agent, the permeability of the HSA does not satisfy a threshold permeability range; and
after the injection of the cooled water with the supplemental agent, the permeability of the HSA satisfies the threshold permeability range.

19. A geothermal system comprising:
a power generation unit;
a pump system;
a well system disposed within a hot sedimentary aquifer (HSA), wherein the well system comprises:
extraction wells that enable the pump system to provide heated water at extraction depths of the HSA to the power generation unit, and
injection wells that enable the pump system to inject cooled water from the power generation unit into the HSA at injection depths,
wherein the extraction wells and the injection wells form two or more well pairs; and
a regulatory device configured to:
generate first control signals configured to instruct the pump system to pump the heated water from the extraction wells to the power generation unit;
generate a second control signal configured to instruct the power generation unit to extract thermal energy from the heated water and to transform the heated water into cooled water; and
generate third control signals configured to instruct the pump system to pump the cooled water from the power generation unit to the injection wells.

20. The geothermal system of claim 19, wherein the HSA is selected based on a predicted power output for the extracted thermal energy that satisfies a threshold power generation requirement.

21. The geothermal system of claim 19, wherein the two or more well pairs are formed according to a wagon-wheel pattern.

22. The geothermal system of claim 19, wherein the two or more well pairs are formed according to a wine-rack pattern.

23. The geothermal system of claim 19, wherein the two or more well pairs are formed according to a gun-barrel pattern.

24. The geothermal system of claim 19, wherein the two or more well pairs are formed according to a chicken-foot pattern.

25. The geothermal system of claim 19, wherein the two or more well pairs are formed according to a vertically-stacked pattern.

26. The geothermal system of claim 19, wherein:
a thickness of the HSA is equal to or less than about 500 meters, and
a depth difference between a shallowest one of the extraction depths and a deepest one of the injection depths is equal to or less than about the thickness of the HSA.

27. The geothermal system of claim 19, wherein:
the third control signals are further configured to instruct the pump system to inject the cooled water with a supplemental agent to enhance a permeability of the HSA;
before an injection of the cooled water with the supplemental agent, the permeability of the HSA does not satisfy a threshold permeability range; and
after the injection of the cooled water with the supplemental agent, the permeability of the HSA satisfies the threshold permeability range.

* * * * *

UNITED STATES PATENT AND TRADEMARK OFFICE
CERTIFICATE OF CORRECTION

PATENT NO. : 11,644,220 B1
APPLICATION NO. : 17/554126
DATED : May 9, 2023
INVENTOR(S) : Marsh et al.

It is certified that error appears in the above-identified patent and that said Letters Patent is hereby corrected as shown below:

In the Specification

In Column 2, Line 30, delete "generation):" and insert -- generation); --, therefor.

In Column 7, Line 29, delete "+10%" and insert -- ±10% --, therefor.

In Column 12, Line 66, delete "D" and insert -- $D_I$ --, therefor.

In Column 29, Line 55, delete "DA" and insert -- $D_I$ --, therefor.

In Column 29, Line 57, delete "Dr." and insert -- $D_I$ --, therefor.

Signed and Sealed this
Twenty-seventh Day of June, 2023

Katherine Kelly Vidal
*Director of the United States Patent and Trademark Office*